(12) United States Patent
Jang

(10) Patent No.: US 11,132,397 B2
(45) Date of Patent: Sep. 28, 2021

(54) SEARCH APPARATUS

(71) Applicant: HANWHA TECHWIN CO., LTD., Seongnam-si (KR)

(72) Inventor: Se Mi Jang, Seongnam-si (KR)

(73) Assignee: HANWHA TECHWIN CO., LTD.

( * ) Notice: Subject to any disclaimer, the term of this patent is extended or adjusted under 35 U.S.C. 154(b) by 347 days.

(21) Appl. No.: 16/242,678

(22) Filed: Jan. 8, 2019

(65) Prior Publication Data

US 2019/0138552 A1    May 9, 2019

Related U.S. Application Data

(63) Continuation of application No. PCT/KR2016/009009, filed on Aug. 17, 2016.

(30) Foreign Application Priority Data

Jul. 25, 2016   (KR) .......................... 10-2016-0094199

(51) Int. Cl.
*G06F 16/73*     (2019.01)
*G06F 3/0481*    (2013.01)
(Continued)

(52) U.S. Cl.
CPC ............ *G06F 16/73* (2019.01); *G06F 3/0481* (2013.01); *G06F 3/0488* (2013.01); *G06F 3/04812* (2013.01); *G06F 3/04847* (2013.01); *G06F 3/04883* (2013.01); *G06F 16/7867* (2019.01); *G06F 3/04817* (2013.01)

(58) Field of Classification Search
CPC .... G06F 16/73; G06F 16/7867; G06F 3/0481; G06F 3/04812; G06F 3/04847; G06F 3/0488; G06F 3/04883
See application file for complete search history.

(56) References Cited

U.S. PATENT DOCUMENTS 7,257,254 B2 *  8/2007  Tunney .................... G06K 9/00
                                              345/179
8,217,904 B2 *  7/2012  Kim .................. H04M 1/72427
                                              345/173

(Continued)

FOREIGN PATENT DOCUMENTS

KR     10-2013-0107863     10/2013

OTHER PUBLICATIONS

International Search Report dated Apr. 21, 2018, in International Application No. PCT/KR2016/009009 (with English Translation).

*Primary Examiner* — Huawen A Peng
(74) *Attorney, Agent, or Firm* — H.C. Park & Associates, PLC

(57) ABSTRACT

A search device includes: a storage unit configured to store a video obtained from a camera; a screen unit to display the video; and a control unit to control operation of the storage unit and the screen unit, wherein the screen unit may display a time control interface for receiving a time condition, wherein the search device may search for videos and events stored in the storage unit in response to the time condition, and wherein the time control interface may include an AM control interface for receiving a morning time as the time condition and a PM control interface for receiving an afternoon time as the time condition.

20 Claims, 27 Drawing Sheets

(51) Int. Cl.
*G06F 3/0488* (2013.01)
*G06F 16/78* (2019.01)
*G06F 3/0484* (2013.01)

(56) References Cited

U.S. PATENT DOCUMENTS

| | | | |
|---|---|---|---|
| 9,330,098 B2* | 5/2016 | Lin | G06F 16/48 |
| 9,529,522 B1* | 12/2016 | Barros | G06F 16/9535 |
| 2008/0081594 A1 | 4/2008 | Lee | |
| 2009/0288011 A1* | 11/2009 | Piran | G06F 3/048 |
| | | | 715/720 |
| 2010/0157742 A1 | 6/2010 | Relyea et al. | |
| 2011/0070924 A1 | 3/2011 | Kim | |
| 2011/0298830 A1* | 12/2011 | Lam | G06F 3/04883 |
| | | | 345/661 |
| 2015/0002675 A1* | 1/2015 | Kundu | G06K 9/00718 |
| | | | 348/150 |
| 2015/0212684 A1 | 7/2015 | Sabia et al. | |

* cited by examiner

SEARCH APPARATUS

CROSS REFERENCE TO RELATED APPLICATION

This application is a Bypass Continuation of International Application No. PCT/KR2016/009009, filed Aug. 17, 2016, which claims priority from and the benefit of Korean Patent Application No. 10-2016-0094199, filed on Jul. 25, 2016, which is hereby incorporated by reference for all purposes as if fully set forth herein.

BACKGROUND

Field

Exemplary implementations of the invention relate generally to a search device, and more particularly, to a search device to which a time condition for searching for videos or events stored in advance can be easily input.

Discussion of the Background

Generally, surveillance systems are widely used in various places including banks, department stores, and residential areas. These surveillance systems can be used for crime prevention and security purposes, but recently, they are also used to monitor pets or children indoors in real time. The most commonly used surveillance system is a closed circuit television (CCTV) system in which a camera is installed at an appropriate location to capture a desired area, and a user keeps an eye on the desired area by monitoring a video captured by the camera.

Recently, such a CCTV system provides a playback function. The term 'playback' refers to a function of storing a video obtained by capturing a desired area using a camera and later loading and reproducing the video so that a user can monitor the video. In addition, CCTVs have recently been connected to various sensors to detect the occurrence of an event using the sensors and also provide an event notification function for notifying a user of the occurrence of an event.

However, when a user later tries to check past videos or events using the playback or event function, the amount of content accumulated is too large. Therefore, the user needs to perform a search in order to check only necessary videos or events. In this regard, there is a growing interest in the development of user interface (UI)/user experience (UX) for user convenience that can easily search for such videos or events.

The above information disclosed in this Background section is only for understanding of the background of the inventive concepts, and, therefore, it may contain information that does not constitute prior art.

SUMMARY

Devices constructed according to exemplary implementations of the invention are capable of providing a search device including a user interface (UI)/user experience (UX) that can easily specify a desired date, time, type of event, etc. on one screen to search for videos and events without the need to specify the above items one by one through multiple stages.

It is to be understood that both the foregoing general description and the following detailed description are exemplary and explanatory and are intended to provide further explanation of the invention as claimed.

According to one or more embodiments of the invention, a search device includes: a storage unit configured to store a video obtained from a camera; a screen unit configured to display the video; and a control unit configured to control operation of the storage unit and the screen unit, wherein the screen unit may be configured to display a time control interface for receiving a time condition, wherein the search device may be configured to search for videos and events stored in the storage unit in response to the time condition, and wherein the time control interface may include an AM control interface for receiving a morning time as the time condition and a PM control interface for receiving an afternoon time as the time condition.

The AM control interface and the PM control interface may have circular shapes which have different radii and are concentric, and an area of each of the AM control interface and the PM control interface represents 12 hours and corresponds to the time represented by an analog clock.

The search device may further include a touch input unit configured to receive a touch signal from a user.

In response to a point on the time control interface being selected, the screen unit may be configured to display a pointing icon at the selected point on the time control interface.

A start time of the time condition may be set in response to the selected point is selected point on the time control interface, and, in response to the selected point being dragged after being held for a predetermined period of time, the screen unit may be configured to display the pointing icon extended along the time control interface.

In response to the pointing icon being pinched out, the screen unit may be configured to display the pointing icon extended along the time control interface.

The screen unit may be further configured to display a calendar icon to receive a date condition, wherein the time control interface further may include at least one of a day control interface and a month control interface for receiving a date condition, and wherein the search device may be configured to search for videos or events stored in the storage unit in response to the date condition.

The time control interface may further include a time display area inside the time control interface for displaying the time condition received, and, wherein, in response to receiving a flick input on the time display area, the search device may be configured to change a date condition according to a direction of the flick input.

The control unit may include: a gesture detector configured to receive a user command by detecting a touch gesture or an air gesture; and a coordinate transformer configured to receive coordinates of the user command received from the gesture detector and configured to generate a time change value of the time control interface.

A search date condition of the time control interface may be changed in response to receiving a touch gesture input and an air gesture input.

The screen unit may be further configured to display an event counter which numerically displays a number of events that meets the time condition.

The screen unit may be further configured to display a direction button, and wherein, in response to receiving an input to the direction button, the search device is configured to automatically search for a time condition in which events occurred.

According to one or more embodiments of the invention, a search system includes: a camera configured to obtain a video by capturing a specific area; a sensor configured to generate a signal in response to detecting a specific event; a search device configured to receive, store, and search for the video and the signal, the search device including: a communication unit configured to receive the video from the camera and the signal from the sensor; a storage unit configured to store the received video and signal; a screen unit configured to display the video; and a control unit configured to control the communication unit, the storage unit, and the screen unit, wherein the screen unit may be configured to display a time control interface for receiving a time condition, the time control interface including an AM control interface for receiving a morning time as the time condition and a PM control interface for receiving an afternoon time as the time condition, wherein the AM control interface and the PM control interface may have circular shapes which have different radii and are concentric, and an area of each of the AM control interface and the PM control interface represents 12 hours and corresponds to the time represented by an analog clock, and wherein the search device may be configured to search for the videos and the specific event stored in the storage unit in response to the time condition.

The control unit may include: a gesture detector configured to receive a user command by detecting a touch gesture or an air gesture; and a coordinate transformer configured to receive coordinates, at which the user command received from the gesture detector and configured to generate a time change value of the time control interface.

The screen unit may be configured to display a pointing icon on the time control interface, and in response to the pointing icon being pinched out, the screen unit is configured to display the pointing icon extended along the time control interface.

The screen unit may be further configured to display an event counter which numerically displays a number of events that meets the time condition.

According to one or more embodiments of the invention, a search system includes: a camera configured to obtain a video by capturing a specific area; and a search device configured to receive, stores, and searches for the video, the search device including: a communication unit configured to receive the video from the camera; a storage unit configured to store the received video; a screen unit configured to display the video; and a control unit configured to control the communication unit, the storage unit, and the screen unit, wherein the control unit may be configured to determine an occurrence of an event within a region of interest (ROI) specified in the video obtained by the camera, wherein the screen unit may be configured to display a time control interface for receiving a time condition, the time control interface including an AM control interface for receiving a morning time as the time condition and a PM control interface for receiving an afternoon time as the time condition, wherein the AM control interface and the PM control interface may have circular shapes which have different radii and are concentric, and an area of each of the AM control interface and the PM control interface represents 12 hours and corresponds to the time represented by an analog clock, and wherein the search device may be configured to search for videos and events stored in the storage unit in response to the time condition.

The control unit may include: a gesture detector configured to receive a user command by detecting a touch gesture or an air gesture; and a coordinate transformer configured to receive coordinates, at which the user command received, from the gesture detector and configured to generate a time change value of the time control interface.

The screen unit may be configured to display a pointing icon on the time control interface, and In response to the pointing icon being pinched out, the screen unit is configured to display the pointing icon extended along the time control interface.

The screen unit may be further configured to display an event counter which numerically displays a number of events that meets the time condition

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
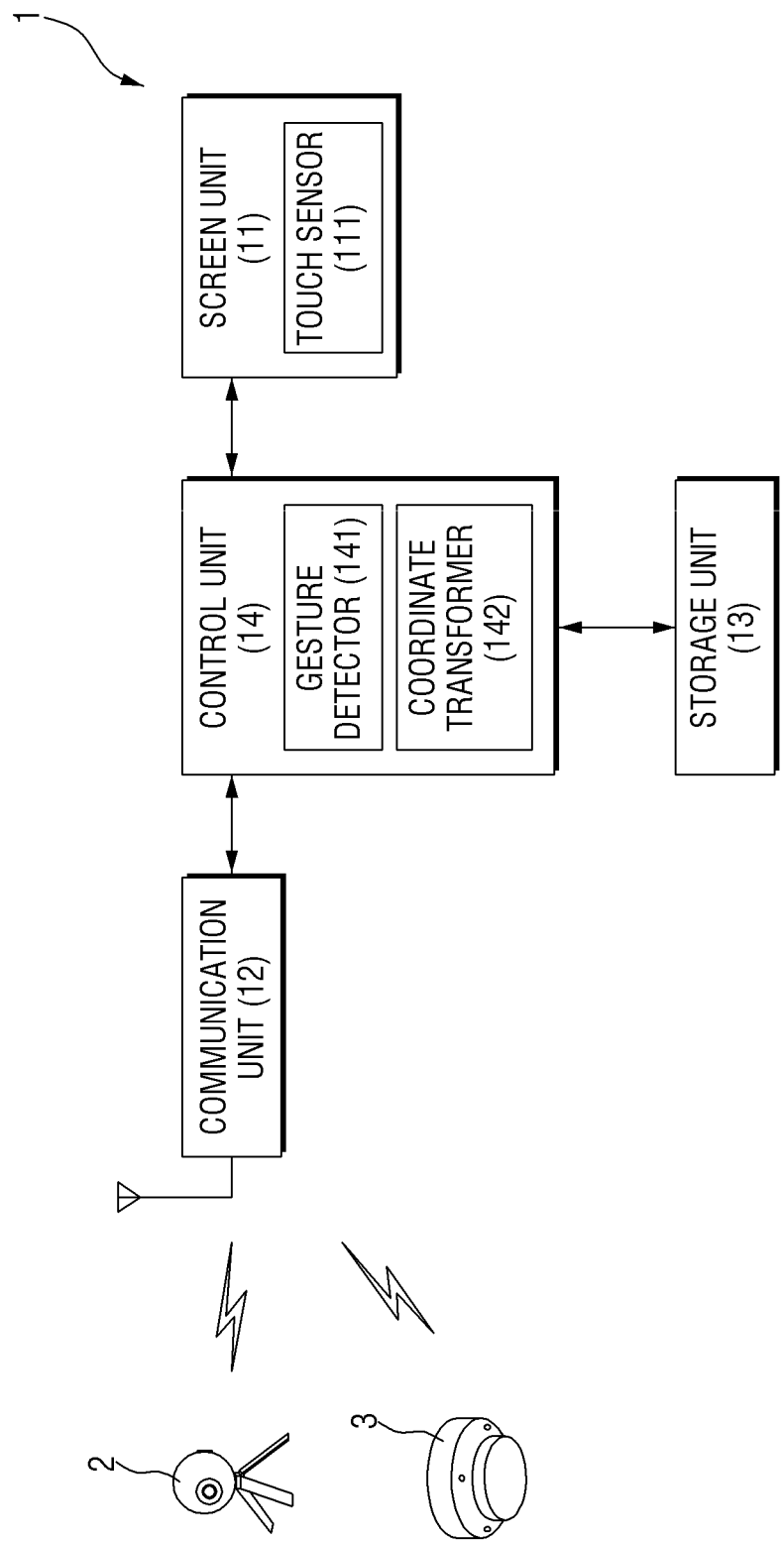
FIG. 1 is a block diagram of a search system according to an exemplary embodiment of the present disclosure.

In the following description, for the purposes of explanation, numerous specific details are set forth in order to provide a thorough understanding of various exemplary embodiments or implementations of implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the present disclosure will be described in detail with reference to the accompanying drawings.

Figure 2:
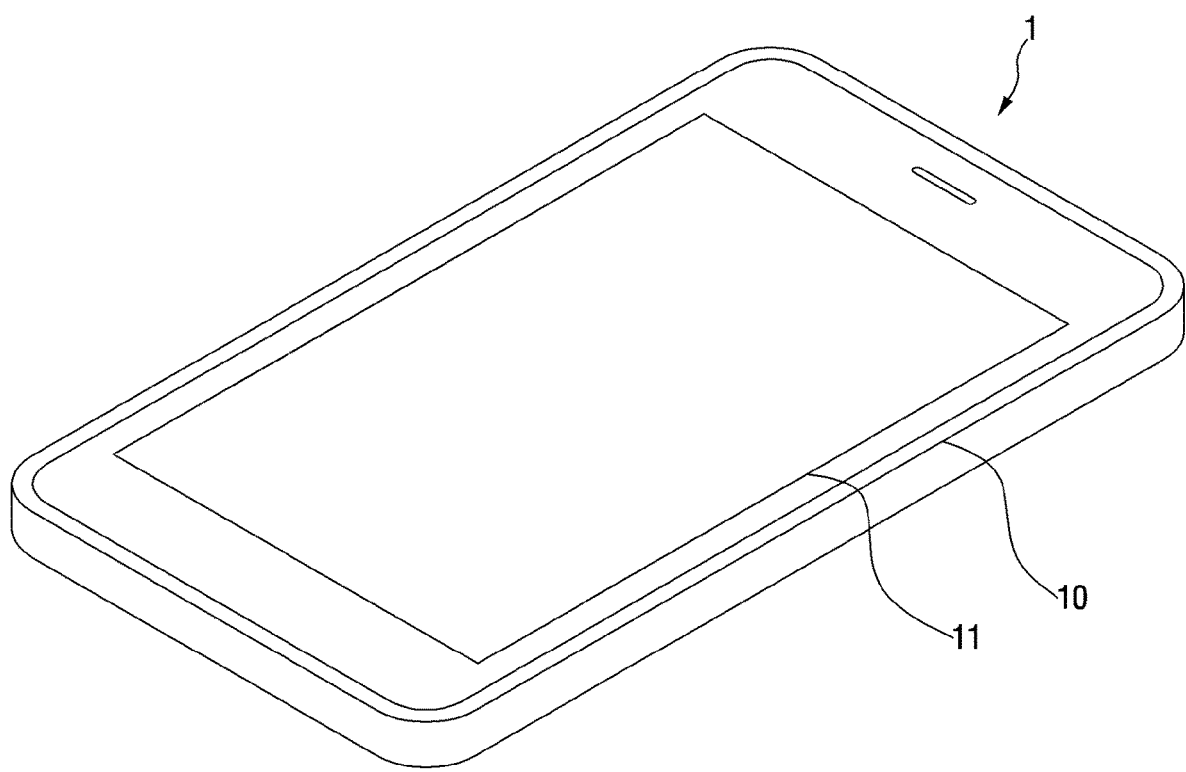
FIG. 2 is a perspective view of a search device of FIG. 1.

FIG. 1 is a block diagram of a search system according to an exemplary embodiment of the present disclosure. FIG. 2 is a perspective view of a search device 1 of FIG. 1.

According to a method using the search system according to the exemplary embodiment of the present disclosure, a time control interface 20 is displayed on a screen unit 11 of the search device 1. Through the time control interface 20, a user can input a time condition for searching for videos already captured and stored in the past or events that occurred in a specific area. Here, the time control interface 20 may be simply formed so that the user can easily input the time condition.

The search system according to the exemplary embodiment of the present disclosure includes a camera 2 configured to obtain a video by capturing a specific area, a sensor 3 configured to transmit a signal when detecting the occurrence of an event, and the search device 1 configured to receive and displays the video obtained by the camera 2 and receives the signal from the sensor 3. The camera 2 or the sensor 3 and the search device 1 are connected to each other in a wired or wireless manner to transmit and receive video data or signals.

The camera 2 according to the exemplary embodiment of the present disclosure may be a pan-tilt camera. 2 capable of panning and tilting. Alternatively, the camera 2 may be a 360-degree camera 2 introduced recently. The 360-degree camera 2 refers to a camera 2 capable of capturing all directions simultaneously using a plurality of fisheye lenses, instead of the camera 2 itself physically panning or tilting. In this case, a video obtained by the 360-degree camera 2 is panned or tilted by software installed in the search device 1. The camera 2 according to the exemplary embodiment of the present disclosure is not limited to the above examples, and various cameras 2 can be used.

The sensor 3 according to the exemplary embodiment of the present disclosure may detect an event. Examples of the sensor 3 include a fire sensor 3 for detecting the outbreak of fire, a smoke sensor 3 for detecting the generation of smoke, and a heat or motion sensor 3 for detecting the appearance of a person or an animal. Furthermore, in recent years, an Internet of Things (IoT) network that enables distributed elements such as objects to exchange information with each other has been developed. The sensor 3 according to the exemplary embodiment of the present disclosure may be a sensor 3 built in an IoT-dedicated module to implement such IoT technology. That is, the sensor 3 is not limited to a particular type, and various types of sensors 3 can be used as long as they can detect any type of event.

According to another exemplary embodiment of the present disclosure, the sensor 3 does not exist. When an event occurs in a specific area while the camera 2 is capturing the specific area, the occurrence of the event is detected and analyzed using a video obtained by the camera 2. Here, the user may specify a region of interest (ROI), which is an area where the camera 2 can detect the occurrence of an event. The ROI is a region of interest of the user. If the ROI is set in the video obtained by the camera 2, when an event occurs within the ROI, it is possible to identify whether the event has occurred and the type of the event even without the sensor 3.

According to embodiments of the present disclosure, various methods can be used regardless of the presence or absence of the sensor 3 as long as it is possible to identify whether an event has occurred and the type of the event. In the present specification, a case where the sensor 3 is provided separately and the occurrence and type of an event are identified using the sensor 3 will be mainly described. However, this is only for ease of description and is not intended to limit the scope of rights.

The search device 1 according to the exemplary embodiment of the present disclosure receives and displays a video obtained by the camera 2. In addition, the search device 1 detects the occurrence of an event by receiving a signal from the sensor 3. The search device 1 may be a device that provides a touch function, such as a smartphone, a tablet PC, a laptop, etc. However, the search device 1 is not limited to the above examples and may also be a device that receives a user command through a mouse or the like. The search device 1 will hereinafter be described as a device that provides the touch function. However, this is only for ease of description and is not intended to limit the scope of rights.

The screen unit 11 displays a video transmitted from the camera 2. The video may be a real-time video (live view) captured and obtained in real time by the camera 2 or may be a video (playback) loaded and displayed after being previously captured and stored in a storage unit 13. The screen unit 11 displays the time control interface 20 to facilitate retrieval of stored videos or events. If the search device 1 provides the touch function, the screen unit 11 may include a touch sensor 111. In this case, the user may directly input a touch signal through the screen unit 11. The touch sensor 111 may be integrally mounted with the screen unit 11. The touch sensor 111 detects coordinates of an area where a touch occurred, the number and intensity of touches, etc. by sensing a touch on the screen unit 11 and transmits the detection result to a control unit 14. Depending on the way the touch sensor 111 senses a touch, various types such as capacitive, resistive, ultrasonic, and infrared types can be used. Even if the search device 1 provides the touch function, a touch pad may be provided as an input unit if the screen unit 11 does not include the touch sensor 11, A touch may be performed using a finger. However, the present disclosure is not limited to this case, and a touch may also be performed using a stylus pen equipped with a tip through which a microcurrent can flow. If the search device 1 does not provide the touch function, an input unit (such as a mouse) for inputting a user command may be provided.

A communication unit 12 transmits and receives signals and data to and from the camera 2 and the sensor 3 in a wired or wireless manner. For example, the communication unit 12 modulates and frequency up-converts signals and data received from the control unit 14 and transmits the modulated and frequency up-converted signals and data or frequency down-converts and demodulates signals and data received from the camera 2 and the sensor 3 and provides the frequency down-converted and demodulated signals and data to the control unit 14. Through this process, the communication unit 12 may receive video data from the camera 2 or signals from the sensor 3 and transmit data or signals generated by the control unit 14 to the camera 2 or the sensor 3.

The storage unit 13 stores programs for processing and controlling operations of the search device 1, various data generated during the execution of each program, video data received from the camera 2, and signals received from the sensor 3. The storage unit 13 may be embedded in the search device 1. However, in the case of a network camera system, a separate device such as a network video recorder (NVR) may be provided.

The control unit 14 controls the overall operation of the search device 1. For example, the control unit 14 performs processing and controlling for signal and data communication between the communication unit 12 and the camera 2 or the sensor 3 and performs video processing such as decoding and rendering when a video is received through the communication unit 12. In addition, the control unit 14 controls the screen unit 11 to display the time control interface 20 and, if a time condition is input by the user through the time control interface 20, searches for stored videos or events by processing the time condition. The control unit 14 controls the storage unit 13 to store a video and load a stored video. The control unit 14 may be a central processing unit (CPU), a microcontroller unit (MCU), or a digital signal processor (DSP). However, the control unit 14 is not limited to these examples, and various logical operation processors can be used.

The control unit 14 includes a gesture detector 141 and a coordinate transformer 142. The gesture detector 141 detects a touch gesture from the touch sensor 111. The touch gesture includes all touch operations generated from the touch sensor 111. If the search device 1 does not provide the touch function, a user command input through an input unit such as a mouse is detected. The gesture detector 141 manages the touch sensor 111 and includes an application program interface (API) that allows the user to easily use a touch gesture on an application. The API is an interface that controls functions provided by an operating system or programming language so that the functions can be used by an application program. Through the API, the gesture detector 141 receives a user command for executing a camera control application and receives a user command for controlling an activated application.

The coordinate transformer 142 receives coordinates, at which a user command was input, from the gesture detector 141 and generates a time change value of the time control interface 20 based on the coordinates. When the user touches a point on the time control interface 20 to input a time condition, coordinates of the point are extracted. When the user performs a drag on the time control interface 20, coordinates on the drag path are extracted at regular periods or intervals. The coordinate transformer 142 may identify the direction and distance in which the drag is performed through the extracted coordinates and transform the extracted coordinates into a value used to change a pointing icon 21. By changing the pointing icon 21 using the value and displaying the result on the screen unit 11, it is possible to input a time condition according to the user's command.

Figure 3:
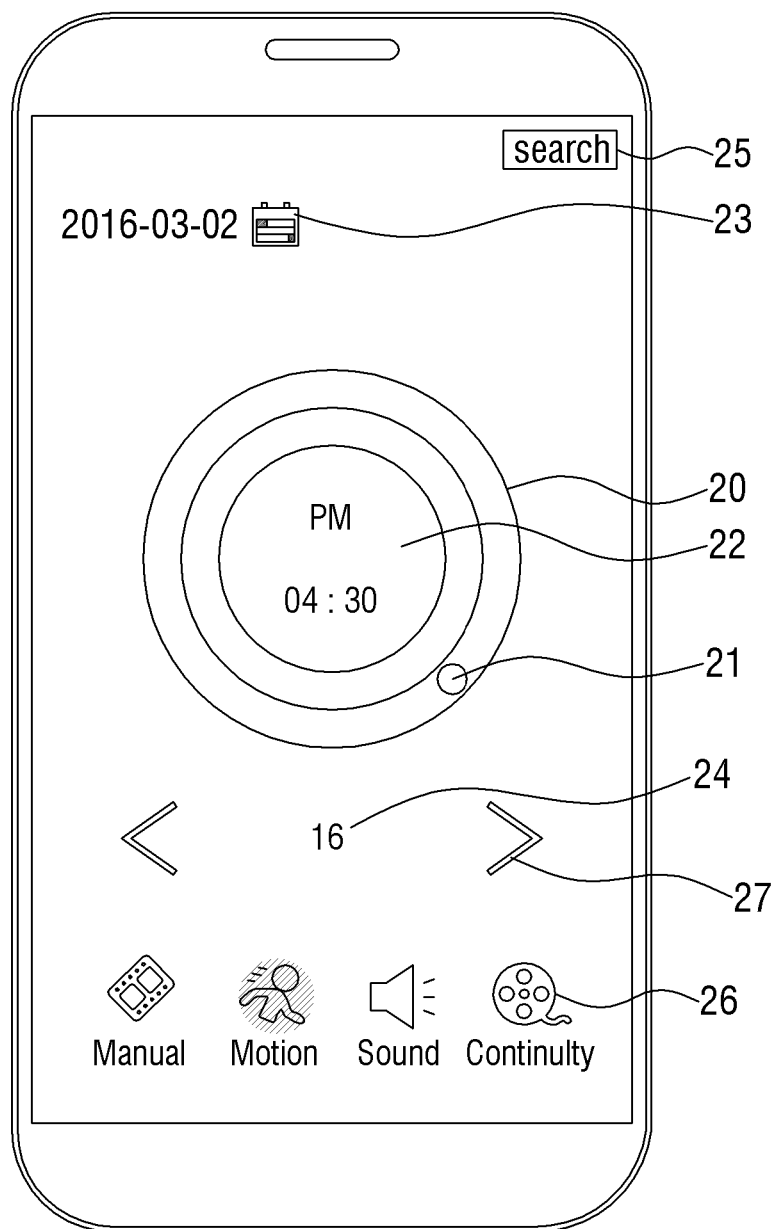
FIG. 3 illustrates a time control interface according to an exemplary embodiment of the present disclosure, which is displayed on a screen unit of the search device.

FIG. 3 illustrates a time control interface 20 according to an exemplary embodiment of the present disclosure, which is displayed on the screen unit 11 of the search device 1.

When the search device 1 according to the exemplary embodiment of the present disclosure is executed, a menu for selecting Live View, Playback, Event, and Option is displayed, although not illustrated in the drawing. Here, if Playback or Event is selected, the time control interface 20 is displayed as illustrated in FIG. 3. The time control interface 20 according to the exemplary embodiment of the present disclosure may be used to search for not only stored videos but also various events that occurred. Therefore, even when Event, instead of Playback, is selected in the menu, the time control interface 20 according to the exemplary embodiment of the present disclosure may be displayed to search for events that occurred during a specific time. In the present specification, a case where the time control interface 20 is used to search for playback videos and events simultaneously will be mainly described. However, this is only for ease of description and is not intended to limit the scope of rights.

Referring to FIG. 3A, the time control interface 20 includes a PM control interface 202 and an AM control interface 201. The user may input a PM (afternoon) time and an AM (morning) time through the PM control interface 202 and the AM control interface 201, respectively. The PM control interface 202 and the AM control interface 201 may have circular shapes that share the same center and have different radii. In the drawing, the PM control interface 202 has a smaller radius than the AM control interface 201 and is thus included in the AM control interface 201. However, the present disclosure is not limited to this case, and the AM control interface 201 may also have a smaller radius than the PM control interface 202, and the AM control interface 201 and the PM control interface 202 may be eccentric instead of being concentric with each other. Further, the two control interfaces may be formed separately, instead of one control interface being included in another control interface.

The circular area of each of the PM control interface 202 and AM control interface 201 corresponds to the shape of an analog clock that is generally familiar to people. That is, the area of each of the PM control interface 202 and the AM control interface 201 represents 12 hours, and the time shown may increase with a clockwise rotation. An upper side from the user's viewpoint may represent 12 o'clock, a right side may represent 3 o'clock, a lower side may represent 6 o'clock, and a left side may represent 9 o'clock. Therefore, the user can easily specify a desired time through the time control interface 20 without unfamiliarity.

A time display area 22 is formed inside the time control interface 20. When the user inputs a time condition using the time control interface 20, the time display area 22 displays the time condition on the screen unit 11. As illustrated in FIG. 3, a search start time and AM or PM are displayed in the time display area 22. However, the present disclosure is not limited to this case, and a search end time, a search period, a search date, etc. may be further displayed.

An event menu icon 26 for selecting a specific type of event to be searched for may be displayed on the screen unit 11. As described above, events that occurred in the past can also be searched for using the search device 1, and there are various types of events such as intruder intrusion, fire, smoke, earthquake, explosion, and animal intrusion. In order to detect these events, various kinds of sensors 3 may be used, or the ROI may be set as described above. The user may need to search for only a specific type of event among the various types of events. Therefore, the user may select only a desired type of event through the event menu icon 26. In FIG. 3, since a motion event has been selected, only a motion event icon is colored in a specific color. Therefore, when the user performs a search using a specific time condition, videos in which motion events occurred will be output as a result. Although not illustrated in the drawing, a plurality of event menu icons 26 may be selected, so that the user can search for a plurality of types of events. In addition, although only four event menu icons 26 are displayed in FIG. 3, various numbers of event menu icons 26 can be displayed according to types of events, as long as events can be searched for.

The screen unit 11 may further display a calendar icon 23 for inputting a date condition and an event counter 24 for showing the number of events that occurred in a time condition input by the user, in addition to the time control interface 20 for inputting a time condition. The functions of the above icons will be described in detail later.

Figure 4:
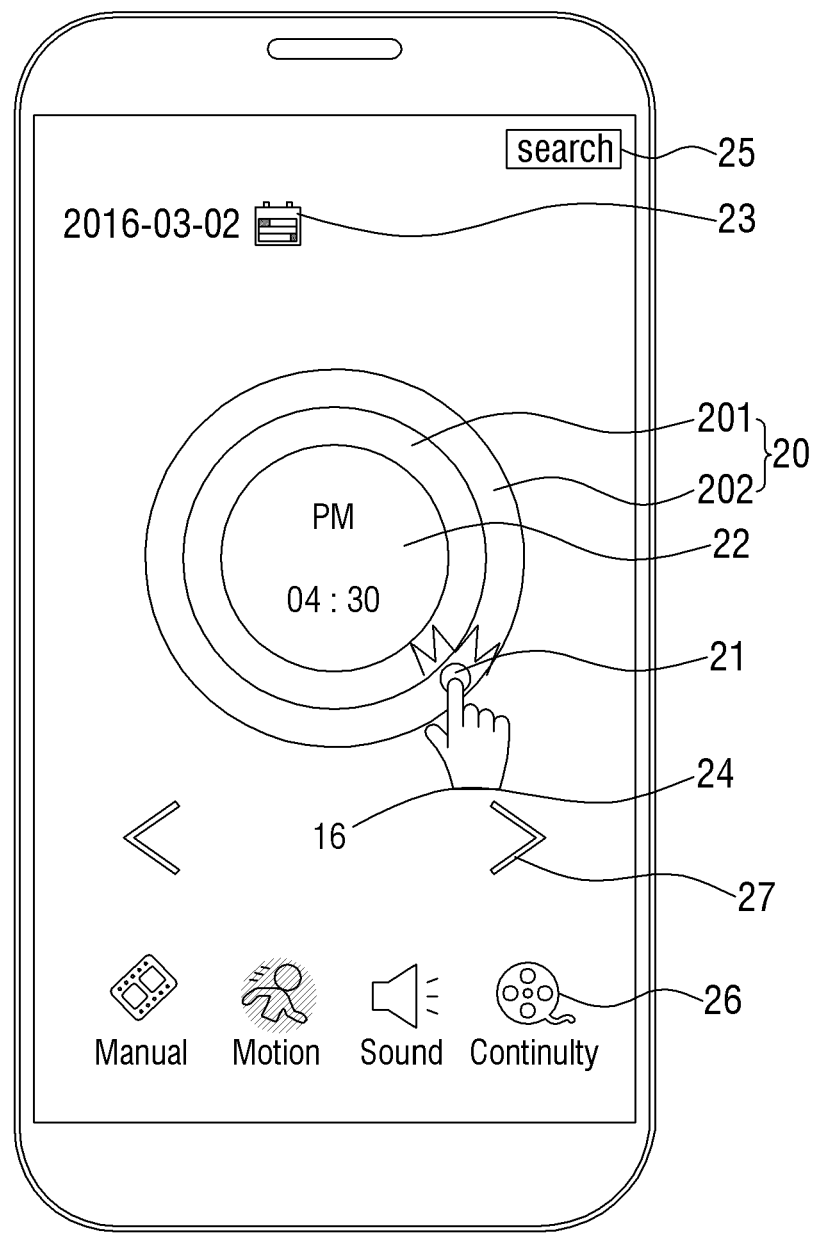
FIG. 4 illustrates an operation of tapping a point on a PM control interface of the time control interface according to an exemplary embodiment of the present disclosure.
Figure 5:
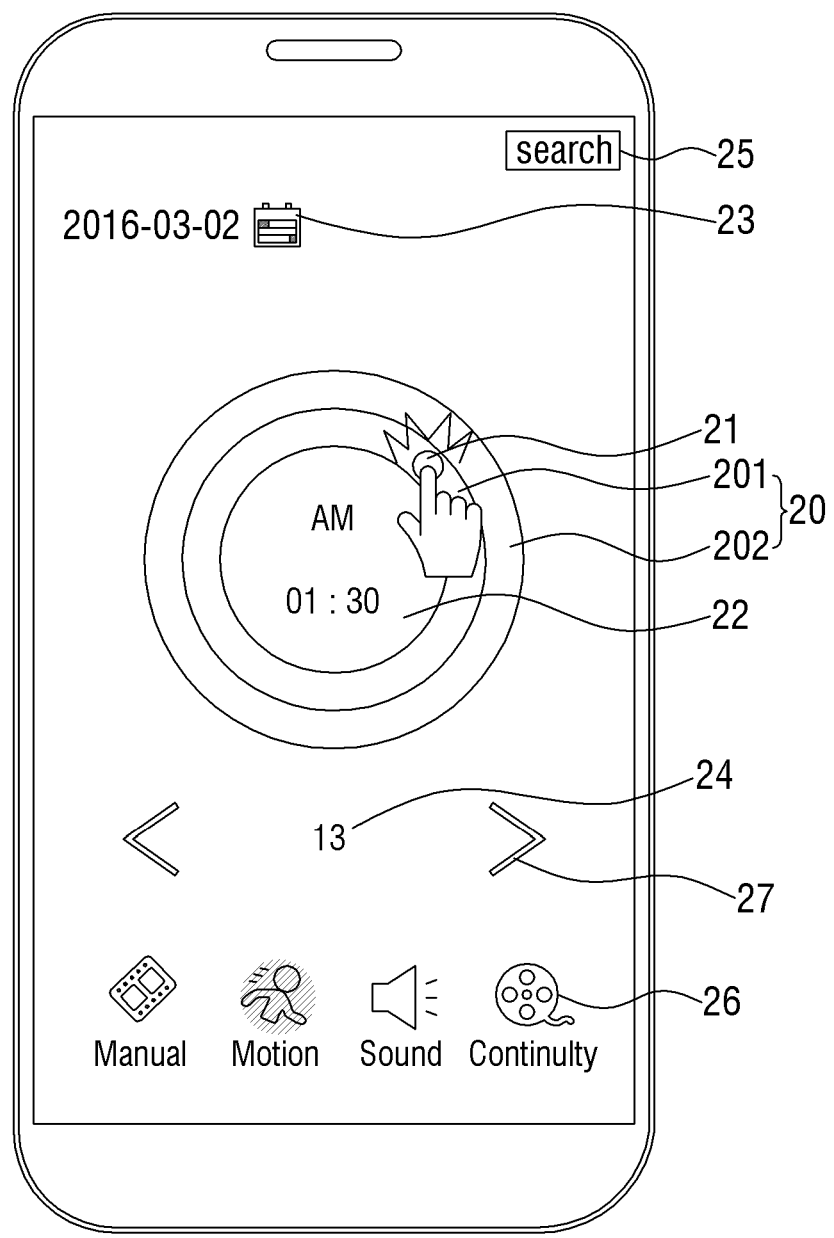
FIG. 5 illustrates an operation of tapping another point on an AM control interface of the time control interface according to an exemplary embodiment of the present disclosure.

FIG. 4 illustrates an operation of tapping on the PM control interface 202 of the time control interface 20 according to an exemplary embodiment of the present disclosure. FIG. 5 illustrates an operation of tapping another point on the AM control interface 201 of the time control interface 20 according to an exemplary embodiment of the present disclosure.

Tap is one of the touch gestures and refers to briefly touching the screen unit 11 and then releasing the touch immediately. When the user taps a point on the time control interface 20 according to the exemplary embodiment of the present disclosure, the pointing icon 21 is positioned at the tapped point. In addition, a time corresponding to the point is displayed in the time display area 22. Here, the time corresponding to the point tapped by the user represents a start time of a time condition input to perform a search. The pointing icon 21 according to the exemplary embodiment of the present disclosure may have a circular shape. However, the shape of the pointing icon 21 is not limited to the circular shape, and the pointing icon 21 can also have various shapes such as a straight line and a square. In addition, a basic time period may be preset to 30 minutes. Therefore, even if an end time is not displayed, the user can know the end time automatically by adding the time period of 30 minutes to the start time specified by the user. If the pointing icon 21 is shaped like a straight line, it denotes that there is no time period. In this case, the user has to specify the start time and the end time separately. This will be described in detail later.

For example, as illustrated in FIG. 4, when the user taps a point of the time control interface 20 corresponding to 4:30 on the PM control interface 202, 4:30 PM is set as the start time. Then, 4:30 PM is displayed in the time display area 22. The point tapped by the user is actually a point indicating 4:30 in the analog clock. In addition, the pointing icon 21 is positioned at the point. Since the basic time period of the pointing icon 21 is 30 minutes, the end time is 5:00 PM. Therefore, by specifying only the start time to perform a search, the user can input a search time condition having 4:30 PM as the start time and 5:00 PM as the end time.

In addition, as illustrated in FIG. 5, when the user taps another point corresponding to 1:30 on the AM control interface 201, 1:30 AM is set as the start time. Then, 1:30 AM is displayed in the time display area 22. The point tapped by the user is actually a point indicating 1:30 in the analog clock. In addition, the pointing icon 21 is positioned at the point. Since the basic time period of the pointing icon 21 is 30 minutes, the end time is 2:00 AM. Therefore, by specifying only the start time to perform a search, the user can input a search time condition having 1:30 AM as the start time and 2:00 AM as the end time.

According to various embodiments of the present disclosure, the end time may also be displayed in the time display area 22, and the basic time period of the pointing icon 21 may also be variously adjusted. Further, the basic time period may not exist in the pointing icon 21, and the user may input a time condition by specifying both the start time and the end time. This will be described in detail later.

The pointing icon 21 is positioned when the user taps a point. Here, the pointing icon 21 may not be displayed at all on the screen unit 11 initially and, when the user taps a point, may be displayed at the point. Alternatively, the pointing icon 21 may be initially displayed at another point on the time control interface 20 and, when the user taps a point, may be moved to the point. That is, the pointing icon 21 may be variously formed before the user taps a point.

If the user can input a command to the search device 1 through a mouse, when a point on the time control interface 20 is clicked, a time corresponding to the point is set as the start time of a time condition, and the pointing icon 21 is positioned at the point.

Figure 6:
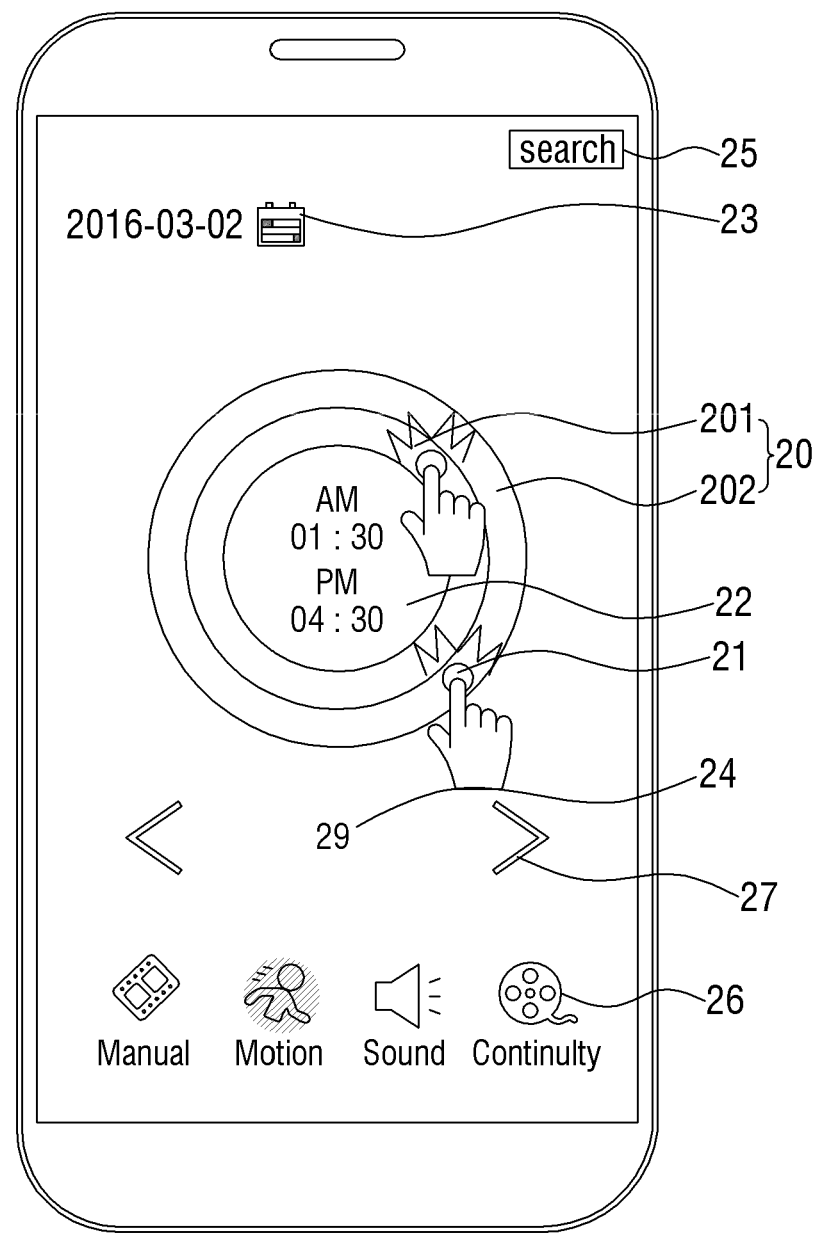
FIG. 6 illustrates an operation of tapping a plurality of points on the time control interface according to an exemplary embodiment of the present disclosure.

FIG. 6 illustrates an operation of tapping a plurality of points on the time control interface 20 according to an exemplary embodiment of the present disclosure.

A time condition may have only one period, but may also have a plurality of periods. This is because the user may want to check the occurrence of playbacks or events in a plurality of periods. In this case, the user may input a plurality of time conditions by tapping a plurality of points on the time control interface 20.

For example, as illustrated in FIG. 6, when the user taps a point corresponding to 4:30 on the PM control interface 202 and another point corresponding to 1:30 on the AM control interface 201, 4:30 PM and 1:30 AM are set as a plurality of start times. Then, 4:30 PM and 1:30 AM are displayed in the time display area 22. Accordingly, the pointing icon 21 is displayed at the one point and the another point. Since the basic time period of the pointing icon 21 is 30 minutes, the end times are 5:00 PM and 2:00 PM, respectively. Therefore, two time conditions, that is, a first time condition having 4:30 PM as the start time and 5:00 PM as the end time and a second time condition having 1:30 AM as the start time and 2:00 AM as the end time are input as desired search time conditions of the user.

The first and second time conditions are OR conditions, not AND conditions. If the first and second time conditions are AND conditions, there are absolutely no videos or events that satisfy these conditions unless the two time conditions overlap. Therefore, when the user searches for playbacks or events by using the input first and second time conditions, results satisfying the first time condition and results satisfying the second time condition are all retrieved and output.

Figure 7:
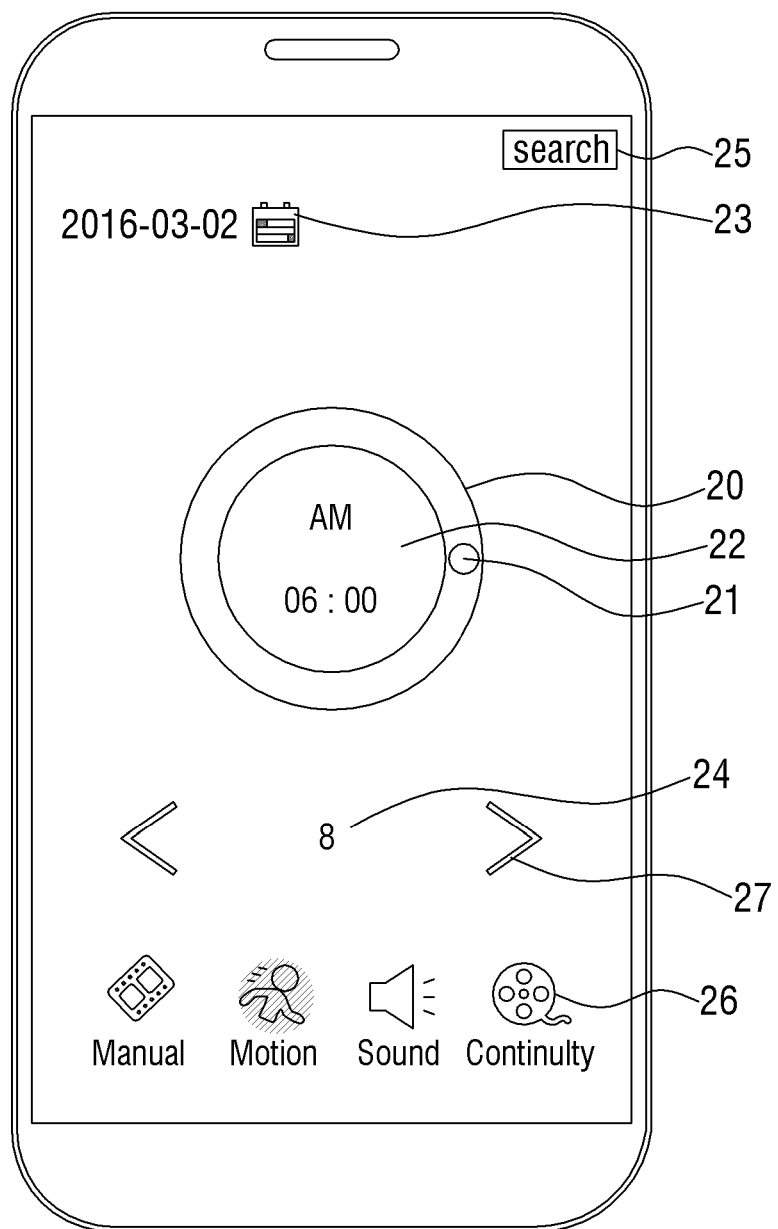
FIG. 7 illustrates a time control interface according to another exemplary embodiment of the present disclosure, which is displayed on the screen unit of the search device.

FIG. 7 illustrates a time control interface 20 according to another exemplary embodiment of the present disclosure, which is displayed on the screen unit 11 of the search device 1.

Referring to FIG. 7, in the time control interface 20 according to the exemplary embodiment of the present disclosure, the AM control interface 201 and the PM control interface 202 are not formed separately, and a morning time and an afternoon time may be specified in one area. Therefore, as illustrated in FIG. 6, the time control interface 20 is formed in the shape of one circle, and the area of the circular shape represents 24 hours. The time shown may increase with a clockwise rotation. In addition, the upper side from the user's viewpoint may represent 24 o'clock, the right side may represent 6 o'clock, the lower side may represent 12 o'clock, and the left side may represent 18 o'clock. Therefore, the user can easily specify a desired time through the time control interface 20 without unfamiliarity.

A time display area 22 which displays a time condition when the user inputs the time condition is formed inside the time control interface 20. As illustrated in FIG. 7, a search start time and AM or PM are displayed in the time display area 22. However, the present disclosure is not limited to this case, and a search end time, a search period, a search date, etc. may be further displayed.

Figure 8:
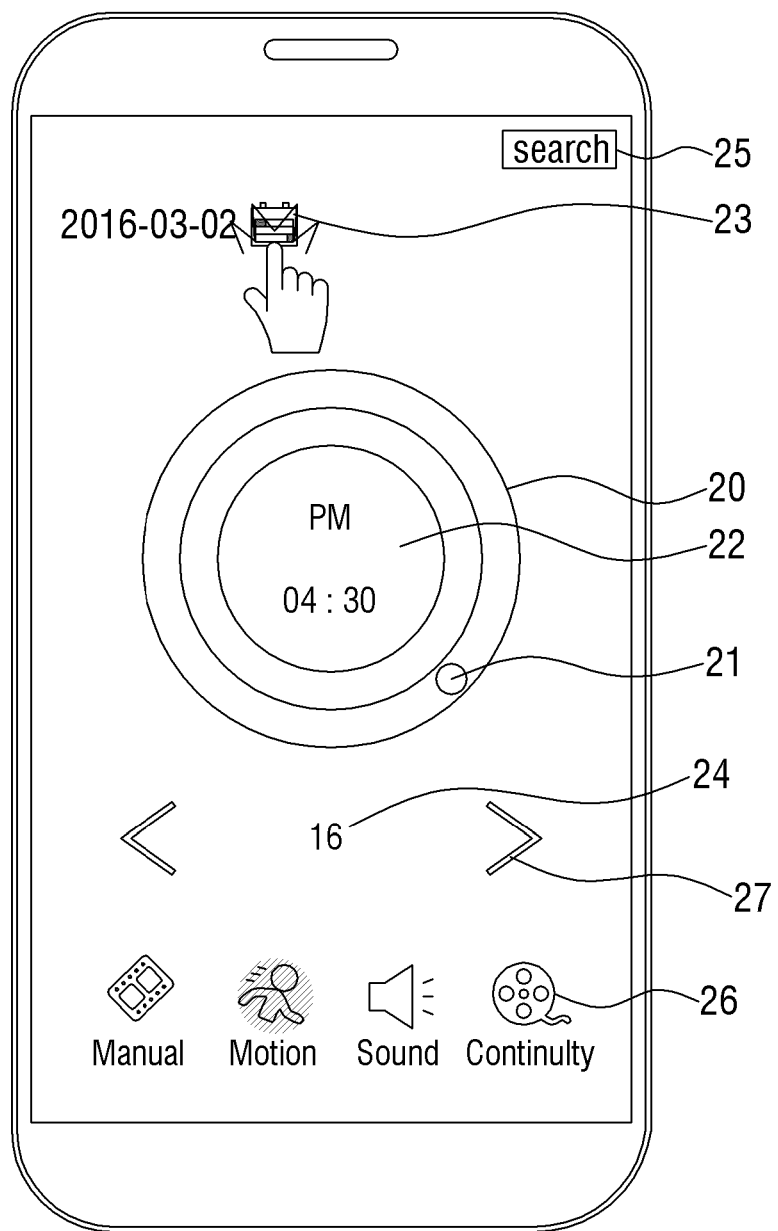
FIG. 8 illustrates an operation of tapping a calendar icon according to an exemplary embodiment of the present disclosure.
Figure 9:
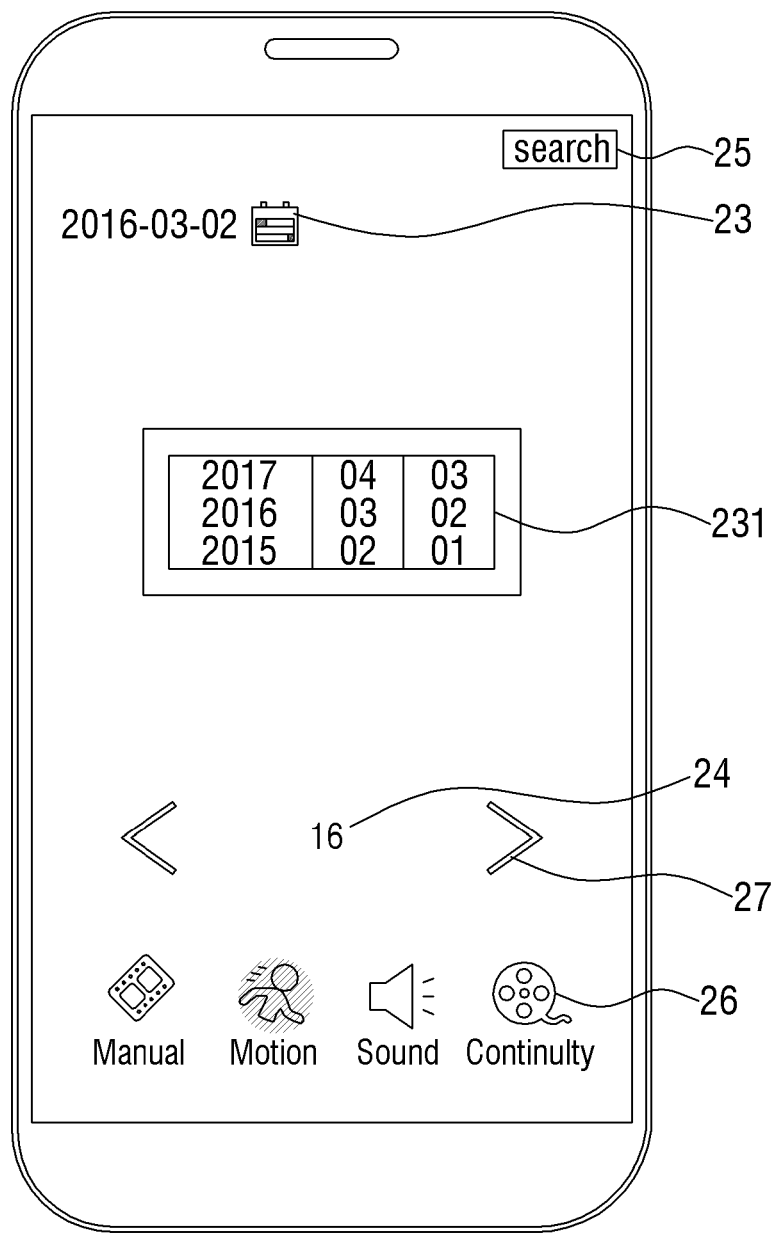
FIG. 9 illustrates a calendar for adjusting a date, which is displayed on the screen unit as a result of the operation of FIG. 8.

FIG. 8 illustrates an operation of tapping a calendar icon 23 according to an exemplary embodiment of the present disclosure. FIG. 9 illustrates a calendar 231 for adjusting a date, which is displayed on the screen unit 11 as a result of the operation of FIG. 8.

The user may input not only a time condition to be searched but also a date condition through the search device 1 according to the exemplary embodiment of the present disclosure. This is because if the time is the same but dates are different, corresponding playback videos or events are different.

When the user taps the calendar icon 23 according to the exemplary embodiment of the present disclosure as illustrated in FIG. 8, the calendar 231 is displayed below the tapped calendar icon 23. The user can input a date condition to be searched using the calendar 231.

The calendar 231 may be a calendar 231 in which year, month, and day are separately changed through scrolling as illustrated in FIG. 9. In this case, the user may specify a specific date through scrolling by dragging up or down each of the year, month, and day. Alternatively, the calendar 231 may be a general calendar in the form of a table in which all dates in a month correspond to corresponding days of the week. In this case, the user may specify a specific date by tapping a desired date. However, the present disclosure is not limited to this case, and the calendar 231 according to the exemplary embodiment of the present disclosure can be variously formed as long as the user can easily specify a specific date.

Figure 10:
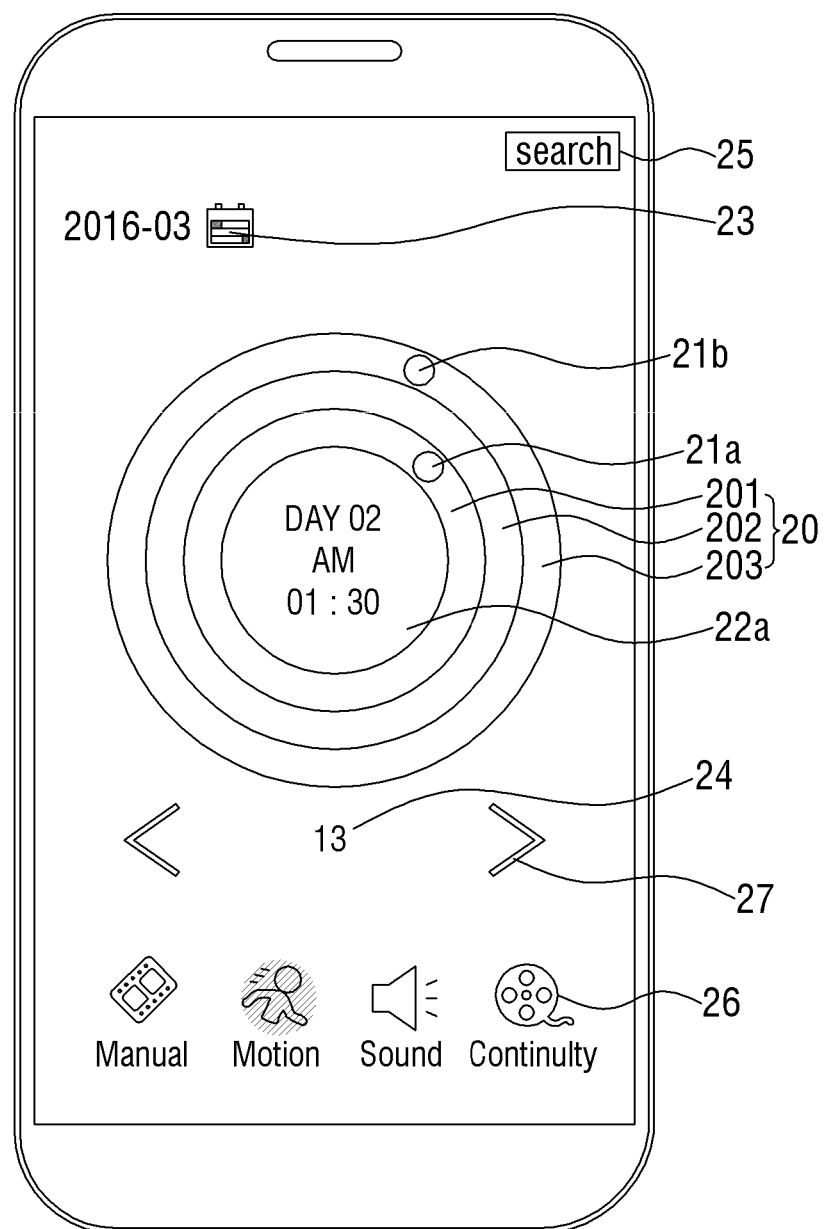
FIG. 10 illustrates a day control interface included in a time control interface according to another exemplary embodiment of the present disclosure.
Figure 11:
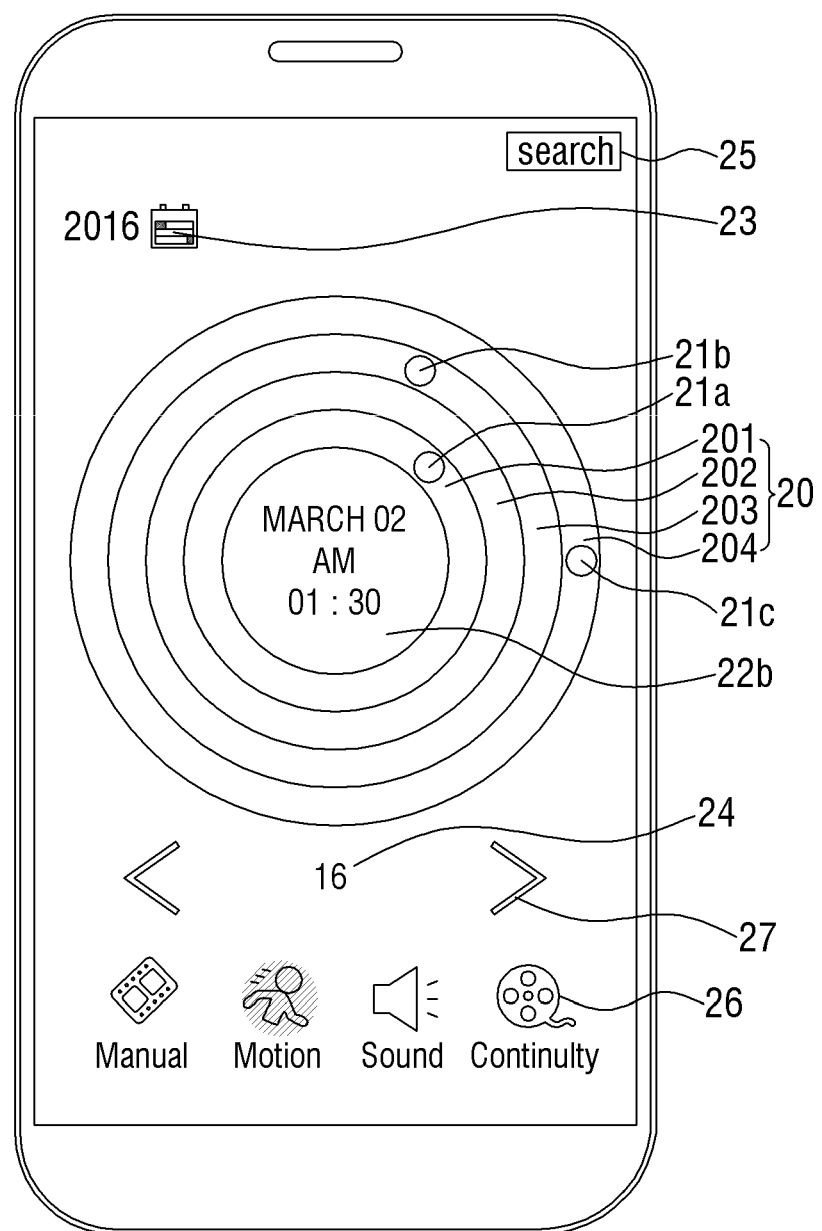
FIG. 11 illustrates a month control interface further included in a time control interface according to another exemplary embodiment of the present disclosure.

FIG. 10 illustrates a day control interface 203 included in a time control interface 20 according to another exemplary embodiment of the present disclosure. FIG. 11 illustrates a month control interface 204 further included in a time control interface 20 according to another exemplary embodiment of the present disclosure.

According to another exemplary embodiment of the present disclosure, the time control interface 20 may include the day control interface 203 as illustrated in FIG. 10. In this case, the user may specify only a year and a month through the calendar icon 23 and specify a specific day through the day control interface 203. Alternatively, according to another exemplary embodiment of the present disclosure, the time control interface 20 may further include the month control interface 204 as illustrated in FIG. 11. In this case, the user may specify only a year through the calendar icon 23 and specify a specific month and a specific day through the month control interface 204 and the day control interface 203, respectively.

Here, each of the day control interface 203 and the month control interface 204 may also have a circular shape and may be concentric with a PM control interface 202 and an AM control interface 201 as illustrated in FIG. 10 or 11. In FIG. 10, the PM control interface 202 and the AM control interface 201 have smaller radii than the day control interface 203 and thus are included in the day control interface 203. In FIG. 11, the PM control interface 202, the AM control interface 201, and the day control interface 203 are included in the month control interface 204. However, the present disclosure is not limited to this case, and the day control interface 203 and the month control interface 204 may have smaller radii than the PM control interface 202 and the AM control interface 201 and thus may be included in the PM control interface 202 and the AM control interface 201, and they may be eccentric instead of being concentric with each other. Further, the PM control interface 202, the AM control interface 201, the day control interface 203, and the month control interface 204 may be formed separately from each other without including each other.

The circular area of the day control interface 203 represents 28 days, 29 days, 30 days, or 31 days depending on the month. In addition, the number of days shown may increase with a clockwise rotation from day 1 on the upper side from the user's viewpoint. The circular area of the month control interface 204 represents January to December. The month shown may increase with a clockwise rotation. The upper side from the user's viewpoint may represent December, the right side may represent March, the lower side may represent June, and the left side may represent September. Therefore, the user can easily specify a desired date through the day control interface 203 and the month control interface 204 without unfamiliarity.

When the user taps a point corresponding to the start time of a desired time condition on the AM control interface 201 or the PM control interface 202 as illustrated in FIGS. 10 and 11, a time pointing icon 21a is positioned at the point. In addition, when the user taps another point corresponding to a desired date on the day control interface 203, a day pointing icon 21b is positioned at the point. When the user taps another point corresponding to a desired month on the month control interface 204, a month pointing icon 21c is positioned at the point. That is, one pointing icon 21 may be displayed on the screen unit for each of the month, day, and time specified by the user.

The specified date, search start time, AM or PM, etc. are displayed in a time display area 22 formed inside the time control interface 20, as illustrated in FIG. 10. Alternatively, the specified month may be further displayed as illustrated in FIG. 11. However, the present disclosure is not limited to this case, and the search end time, the search period, the search year, etc. may be further displayed.

Figure 12:
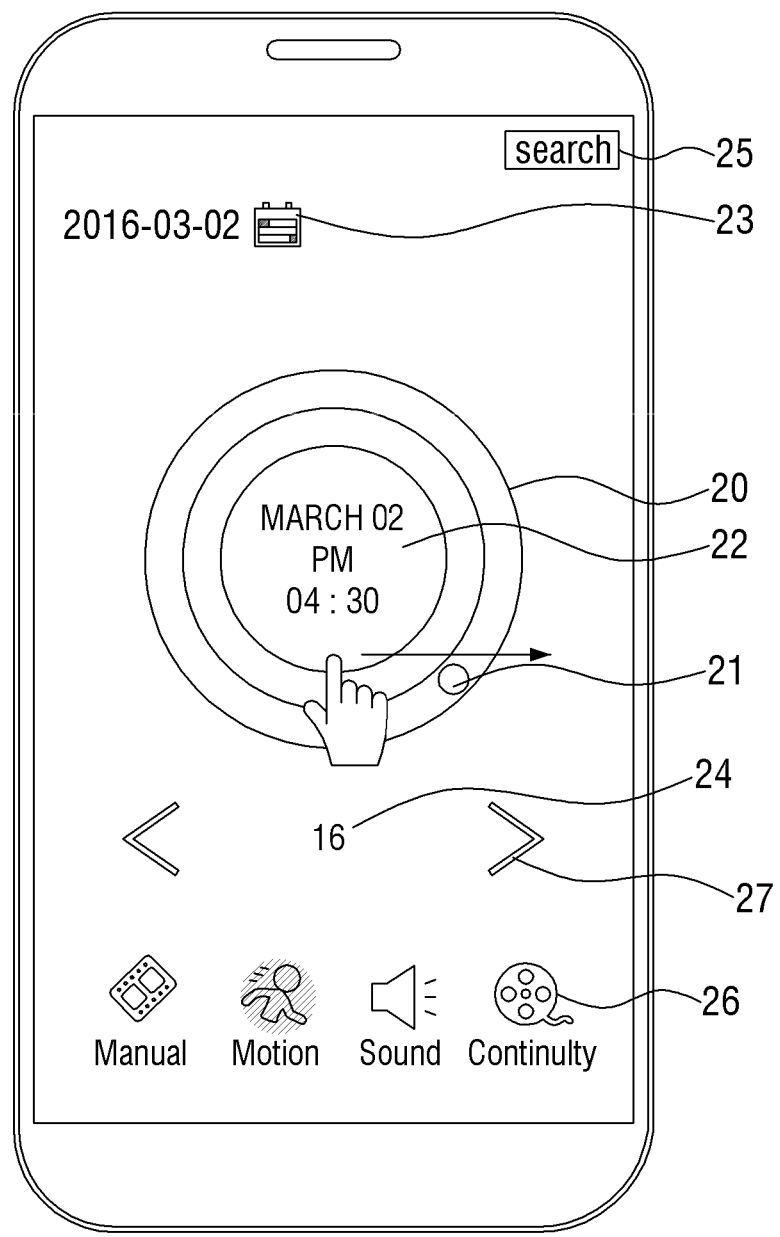
FIG. 12 illustrates an operation of flicking a time display area as a date adjusting method according to another exemplary embodiment of the present disclosure.
Figure 13:
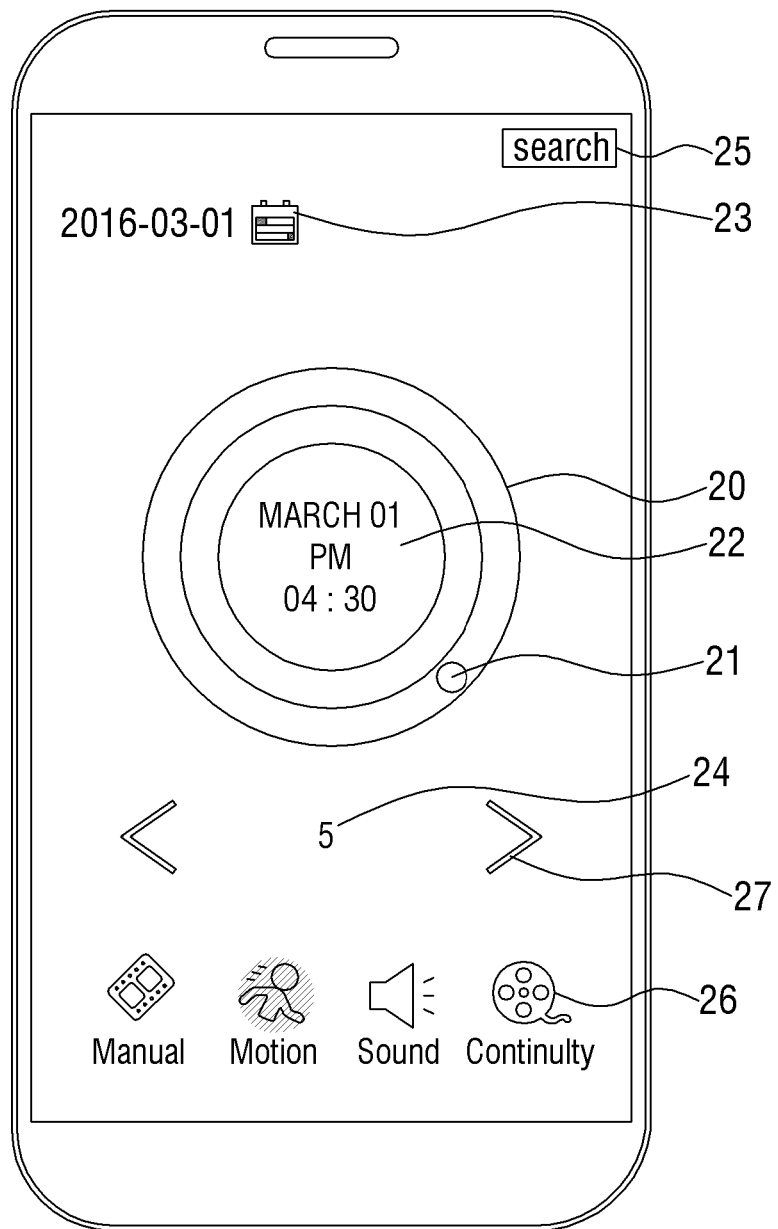
FIG. 13 illustrates a date changed as a result of the operation of FIG. 12.

FIG. 12 illustrates an operation of flicking the time display area 22 as a date adjusting method according to another exemplary embodiment of the present disclosure. FIG. 13 illustrates a date changed as a result of the operation of FIG. 12.

Flick or flick input is one of the touch gestures and refers to quickly sliding a finger in one direction while maintaining the touch of the finger on the screen unit 11 and releasing the touch before stopping the sliding movement of the finger.

If the user touches the time display area 22 and then flicks to the right while maintaining the touch as illustrated in FIG. 12, the date is changed as illustrated in FIG. 13. Here, since the flick to the right has been performed, the date is changed to a date corresponding to a previous day.

Although not illustrated in the drawing, if the user flicks the time display area 22 to the left, the date is changed to a date corresponding to a next day.

Figure 14:
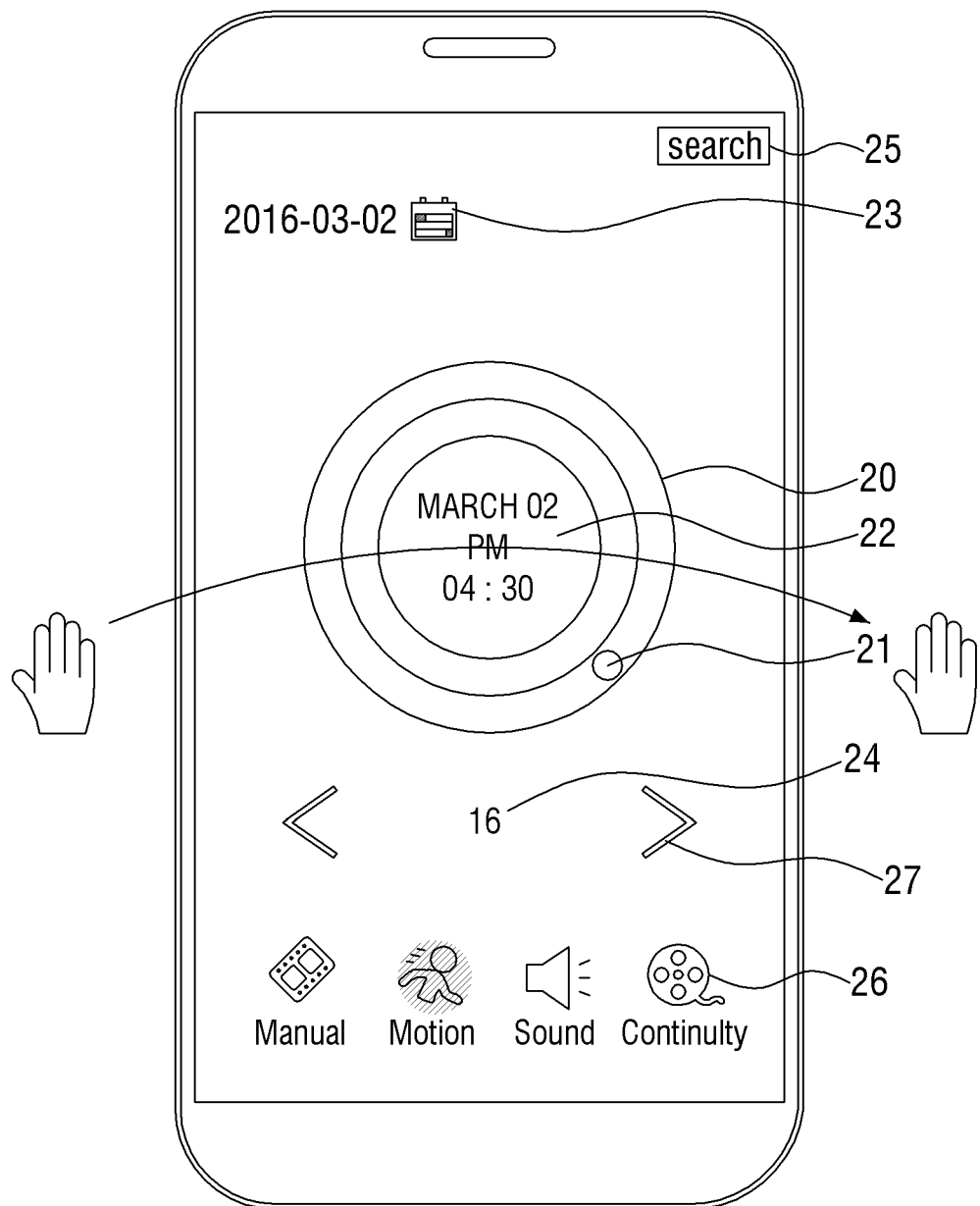
FIG. 14 illustrates an operation of performing an air gesture over the time display area as another date adjusting method according to another exemplary embodiment of the present disclosure.
Figure 15:
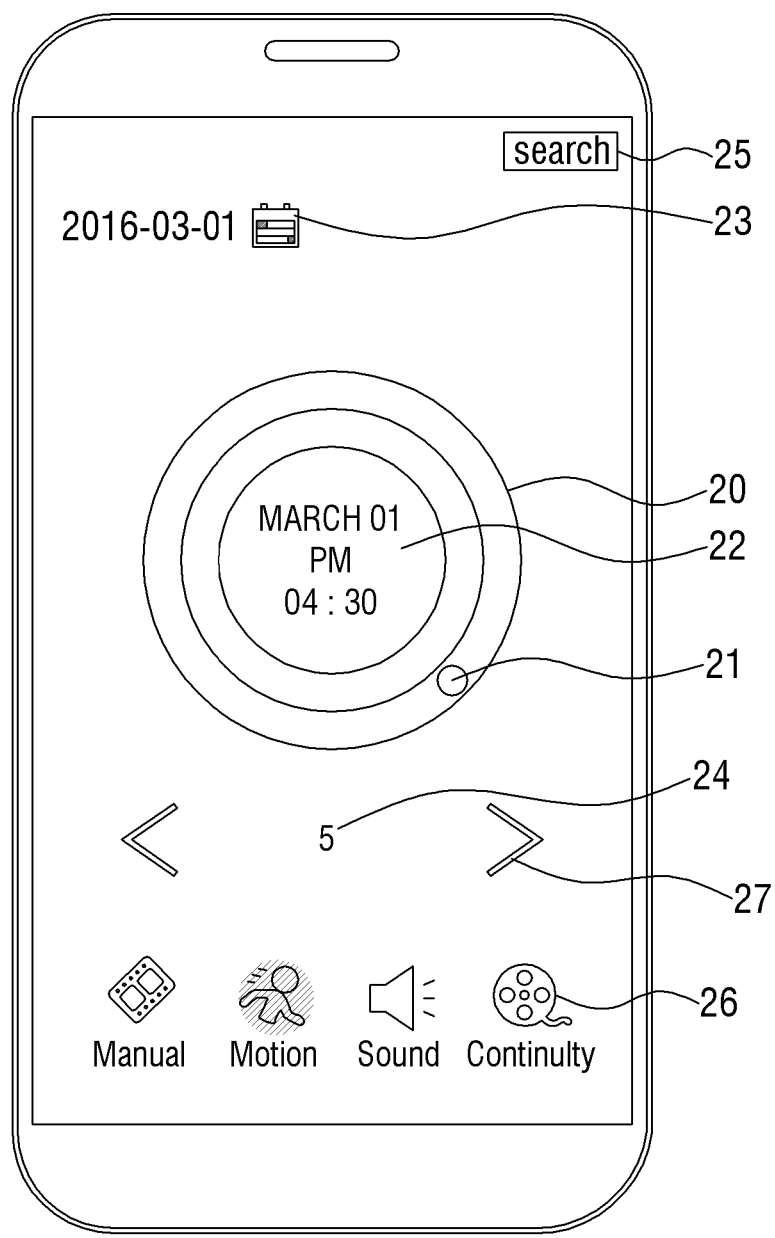
FIG. 15 illustrates a date changed as a result of the operation of FIG. 14.

FIG. 14 illustrates an operation of performing an air gesture over the time display area 22 as another date adjusting method according to another exemplary embodiment of the present disclosure. FIG. 15 illustrates a date changed as a result of the operation of FIG. 14.

Air gesture refers to making a gesture with a hand at a specific distance from an electronic device to make the electronic device operate without directly touching the electronic device. In general, an air gesture of waving a hand in a vertical direction of an electronic device causes an image displayed on the screen unit 11 of the electronic device to be scrolled in the vertical direction. In addition, an air gesture of waving the hand in a horizontal direction of the electronic device causes the image displayed on the screen unit 11 of the electronic device to be moved in the horizontal direction and changed to another image.

If the user performs an air gesture to the right over the screen unit 11, that is, at a specific distance from the search device 1 as illustrated in FIG. 14, the date is changed as illustrated in FIG. 15. Here, since the air gesture to the right has been performed, the date is changed to a date corresponding to a previous day. In addition, as the date is changed, the time display area 22 may be moved to the right side of the screen unit 11 to disappear, and a new time display area 22 may appear from the left side of the screen unit 11. The changed date may be displayed in the new time display area 22.

Although not illustrated in the drawings, if the user performs an air gesture to the left over the screen unit 11, the date is changed to a date corresponding to a next day. Then, the time display area 22 may be moved to the left side of the screen unit 11 to disappear, and a new time display area 22 may appear from the right side of the screen unit 11.

Figure 16:
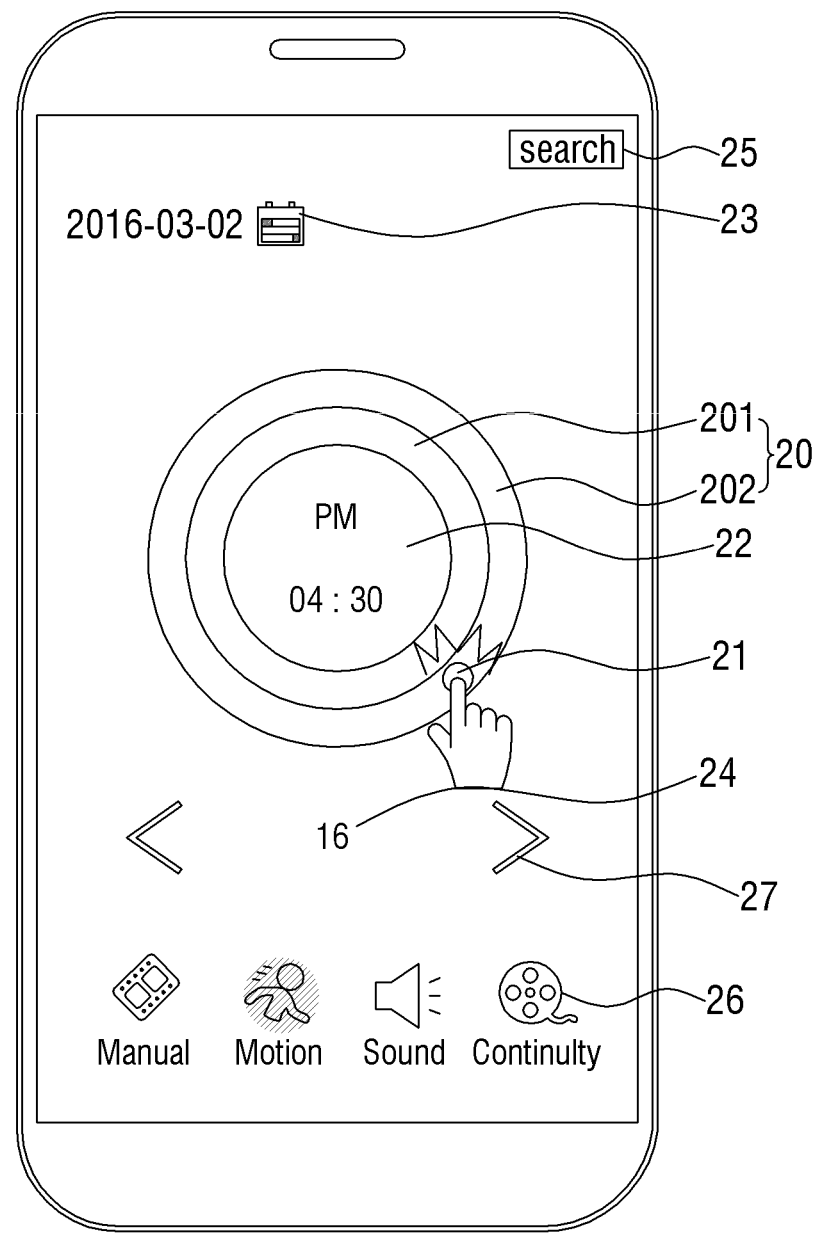
FIG. 16 illustrates an operation of touching a point on the time control interface according to an exemplary embodiment of the present disclosure in order to specify a search start time.
Figure 17:
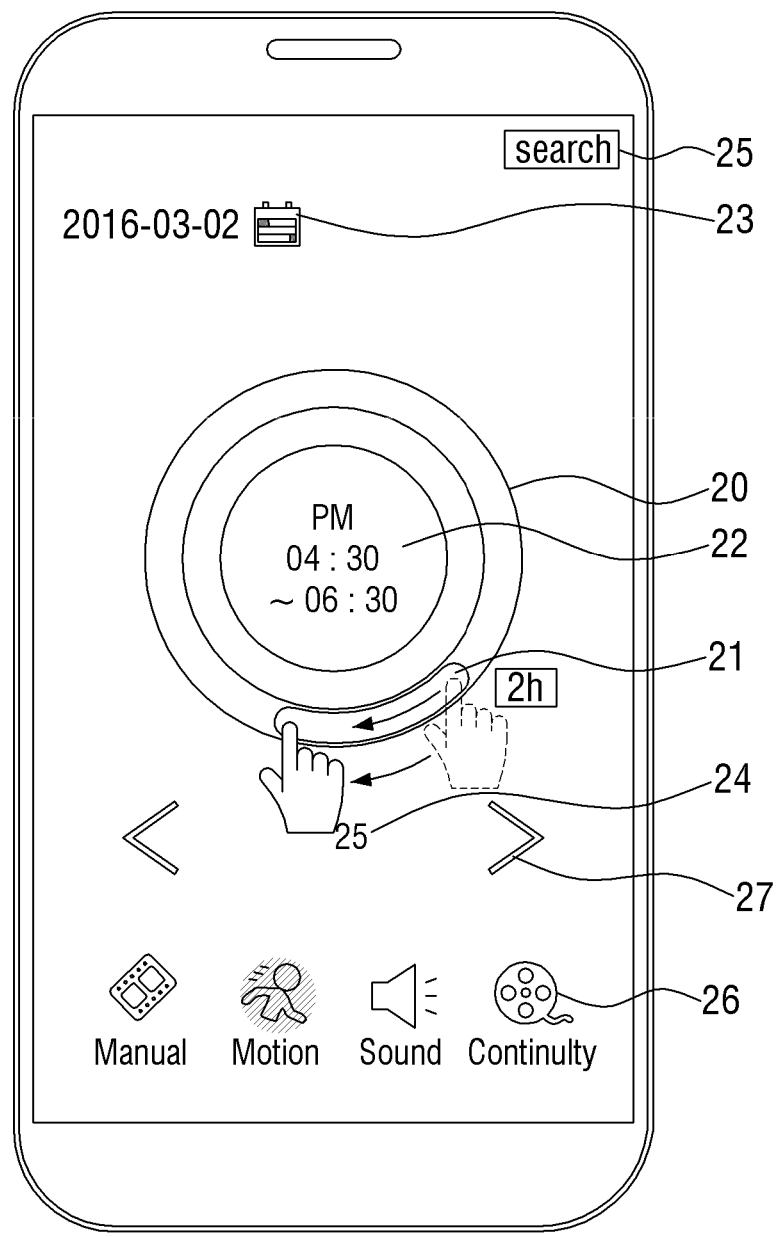
FIG. 17 illustrates an operation of performing a drag without releasing the touch in FIG. 16 in order to change a search time period.

FIG. 16 illustrates an operation of touching a point on the time control interface 20 according to an exemplary embodiment of the present disclosure in order to specify a search start time. FIG. 17 illustrates an operation of performing a drag without releasing the touch in FIG. 16 in order to change a search time period.

Drag is one of the touch gestures and refers to drawing a specific object from one point to another point in order to move the specific object on the screen. Drag is similar to flick in that a finger is slid while the touch of the finger is maintained. In the case of drag, since the touch is released after the sliding of the finger stops, a point where the touch was released is clear. However, in the case of flick, the touch is released naturally from the screen unit 11 before the sliding of the finger stops. Therefore, the point where the touch was released is not clear.

As described above, the pointing icon 21 may have a circular shape. In addition, the basic time period may be preset to 30 minutes. However, if the range of time that the user desires to search is not 30 minutes, a time condition should be input by changing the time period.

There are two methods of inputting a time condition by changing a time period. A first method is a method of specifying the start time of a search time condition first and then changing the time period to specify the end time. A second method is a method of changing the time period first and then specifying the start time and the end time of the time condition together.

In order to perform the first method, according to an exemplary embodiment of the present disclosure, the start time of a search time condition is specified first as illustrated in FIG. 16. That is, the user performs a touch and hold at one point on the time control interface 20. Then, the pointing icon 21 is positioned at the one point touched by the user. Here, the difference from the description of FIG. 4 is that the user holds the touch instead of releasing the touch immediately after performing the touch. Hold refers to an act of maintaining a touch for a predetermined period of time or longer after performing the touch and before performing a drag. The predetermined period of time may be, but is not limited to, about 0.5 seconds to 1 second.

The pointing icon 21 is dragged from the one point to another point along the direction in which the time control interface 20 is formed. Then, as illustrated in FIG. 17, the length of the pointing icon 21 is increased along the direction in which the time control interface 20 is formed. Here, in order to drag the pointing icon 21, the user must maintain the touch. After the pointing icon 21 is dragged to another point, a so-called drop is performed to release the touch. Here, the another point refers to a point corresponding to an end time desired by the user on the time control interface 20.

When the touch is released, the pointing icon 21 is extended from the one point to the point where the touch was released. Then, the search time period is changed to correspond to the length of the pointing icon 21. The changed time period is displayed around the pointing icon 21 as illustrated in FIG. 17. For example, in FIG. 17, the time period is changed from 30 minutes to 2 hours. Then, the changed time period of 2 hours is displayed around the pointing icon 21.

Since the user has specified the start time of the time condition first, the end time is naturally specified as the time period is determined. Then, the start time and the end time of the time condition may be displayed together in the time display area 22. For example, if the user touches a point corresponding to 4:30 PM, the start time of a time condition that the user desires to search is 4:30 PM. In this case, 4:30 PM is displayed as the start time in the time display area 22. If the user performs a drag while maintaining the touch and then releases the touch at a point where the time period becomes 2 hours, the end time becomes 6:30 PM by adding the time period of 2 hours to the start time of 4:30 PM. In this case, 6:30 PM is displayed as the end time in the time display area 22. That is, by dragging the pointing icon 21, the user can change the time period and specify the end time simultaneously.

As described above, the pointing icon 21 may have a circular shape. However, the shape of the pointing icon 21 is not limited to the circular shape, and the pointing icon 21 can also have various shapes such as a straight line and a square. If the pointing icon 21 is shaped like a straight line, it denotes that there is no time period. In this case, the user has to specify the start time and the end time separately. That is, the above-described method can also be used as a method of inputting a time condition when the pointing icon 21 has no basic time period. Here, if the user drags the pointing icon 21 after specifying the start time, the length of the pointing icon 21 may be increased along the direction in which the time control interface 20 is formed. Alternatively, a start pointing icon 21 may be displayed at a location corresponding to the start time, and an end pointing icon 21 may be additionally generated and displayed to be drawn according to the drag of the user. When the user releases the touch at a desired point, a time corresponding to the point where the touch was released on the time control interface 20 is set as the end time. That is, the point icon 21 can be variously formed as long as the user can easily check an input time condition.

If the user can input a command to the search device 1 through a mouse, when the pointing icon 21 is dragged with the mouse, the pointing icon 21 may be extended from one point to another point.

Figure 18:
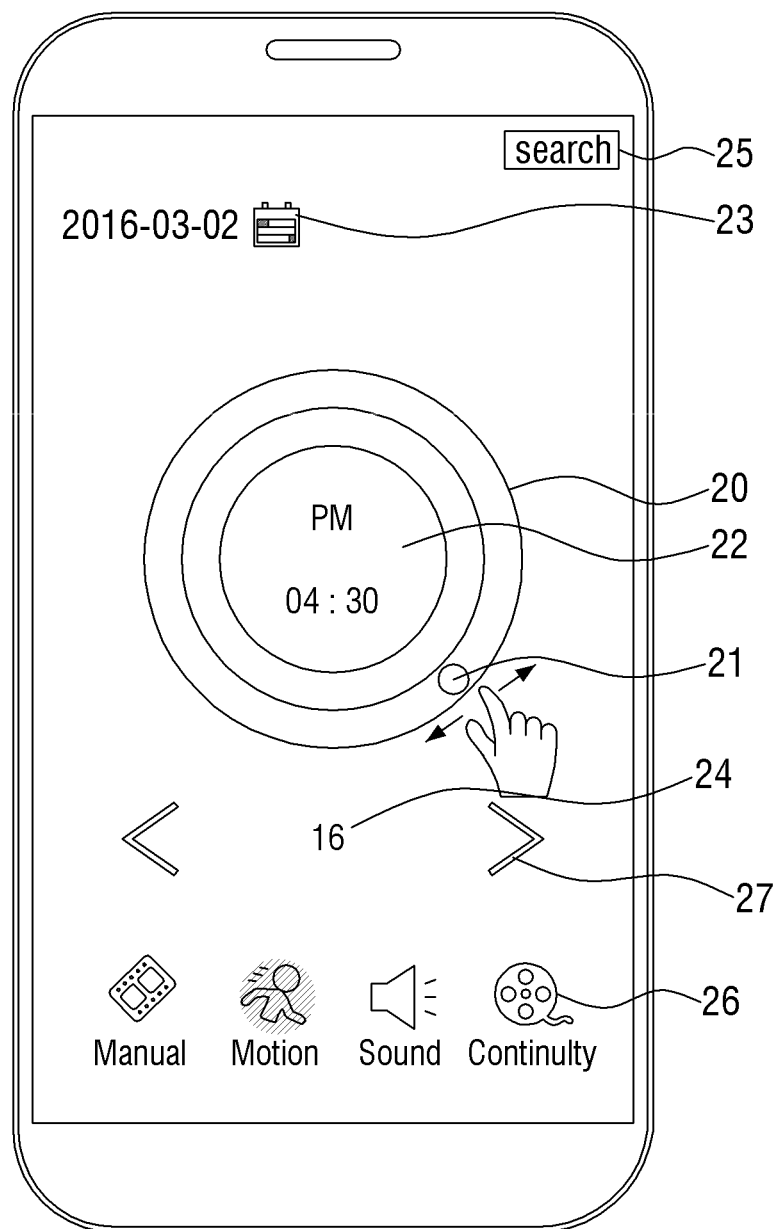
FIG. 18 illustrates an operation of pinching out a pointing icon displayed on the time control interface according to an exemplary embodiment of the present disclosure in order to change the search time period.
Figure 19:
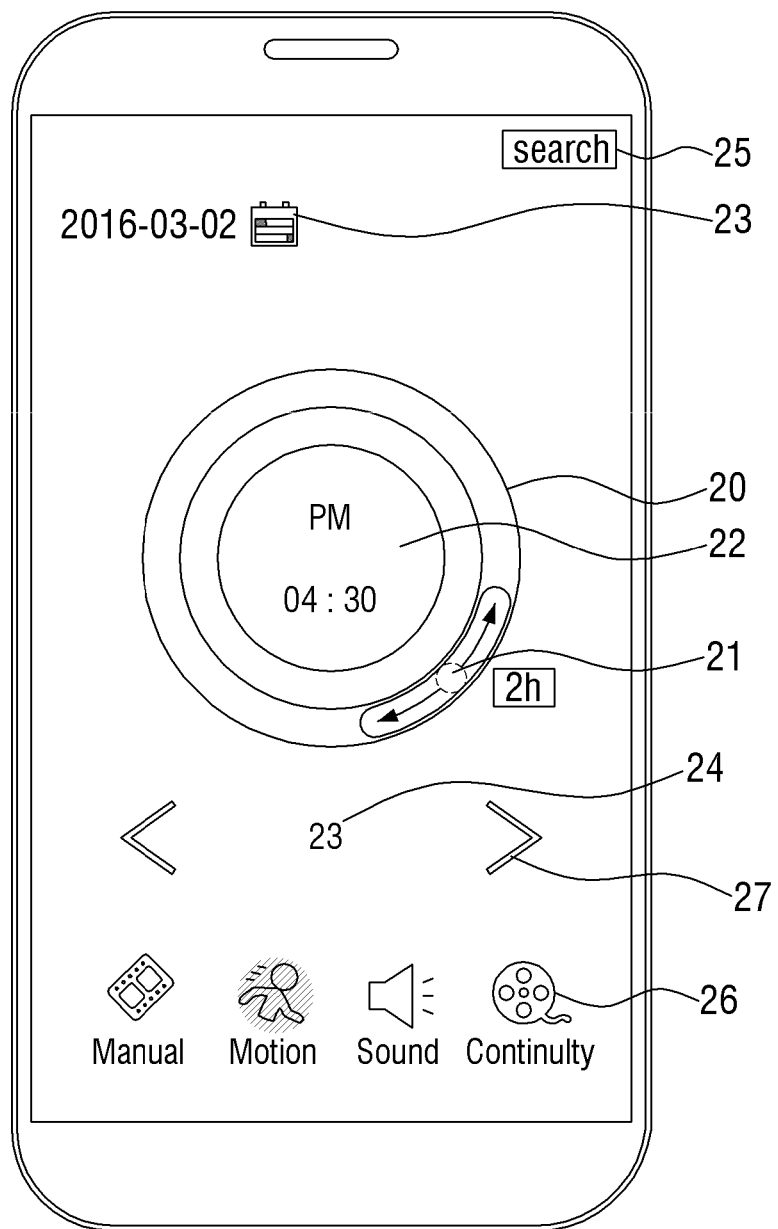
FIG. 19 illustrates the pointing icon whose length has been changed as a result of the operation of FIG. 18.
Figure 20:
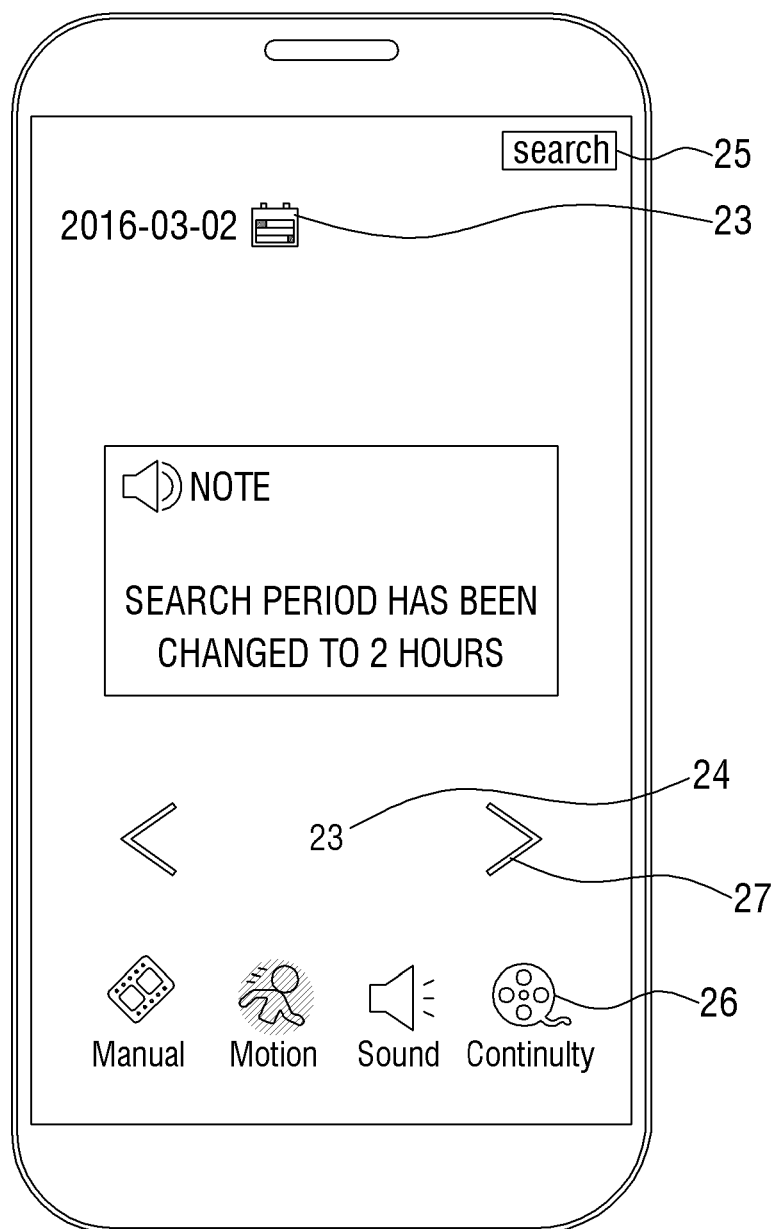
FIG. 20 illustrates a state in which the pinch-out operation of FIG. 18 has been completed.
Figure 21:
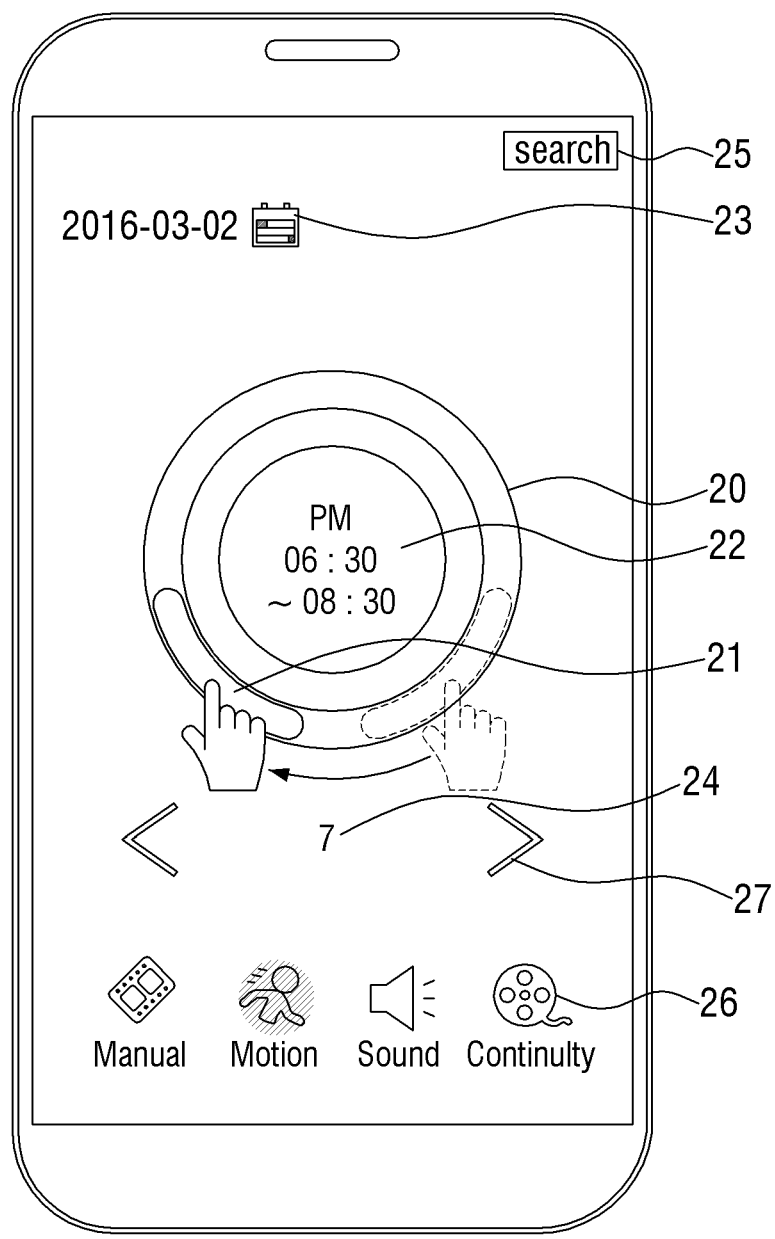
FIG. 21 illustrates an operation of dragging the pointing icon whose length has been changed in FIG. 19.

FIG. 18 illustrates an operation of pinching out the pointing icon 21 displayed on the time control interface 20 according to an exemplary embodiment of the present disclosure in order to change a search time period. FIG. 19 illustrates the pointing icon 21 whose length has been changed as a result of the operation of FIG. 18. FIG. 20 illustrates a state in which the pinch-out operation of FIG. 18 has been completed. FIG. 21 illustrates an operation of dragging the pointing icon 21 whose length has been changed in FIG. 19.

Pinch is one of the touch gestures and refers to sliding two fingers in opposite directions while maintaining the touch of the two fingers on the screen unit 11. In general, pinch is used to adjust the magnification of the screen displayed on the screen unit 11 or the magnification of a specific object. If the two fingers are slid in directions approaching each other, it is called pinch in or pinch close. In this case, an image or a specific object may be reduced. Conversely, if the two fingers are slid in directions away from each other, it is called pinch out or pinch open. In this case, the image or the specific object may be enlarged.

In order to perform the second method of inputting a time condition by changing a time period, according to an exemplary embodiment of the present disclosure, the time period is changed first as illustrated in FIG. 18. That is, the user pinches out the pointing icon 21. Then, as illustrated in FIG. 19, the length of the pointing icon 21 is increased along the direction in which the time control interface 20 is formed. Here, the user must maintain the touch. Even if the user does not input any command to the search device 1 here, the pointing icon 21 should already be displayed.

If the length of the pointing icon 21 is increased, the search time period is changed to correspond to the length of the pointing icon 21. The changed time period is displayed around the pointing icon 21 as illustrated in FIG. 19. For example, in FIG. 19, the time period is changed from 30 minutes to 2 hours. Then, the changed time period of 2 hours is displayed around the pointing icon 21.

After the length of the pointing icon 21 is increased sufficiently to correspond to a desired time period of the user, the user performs a so-called drop to release the touch. Then, as illustrated in FIG. 20, a notification indicating that the search period has been changed is displayed on the screen unit 11.

Since the user has changed the time period first, the start time and end time of the time condition are naturally specified as the location of the time period is changed. In order to change the location of the time period, the pointing icon 21 is dragged as illustrated in FIG. 21. That is, on the time control interface 20, the pointing icon 21 is dragged and moved to a location corresponding to the start time and end time desired by the user. Here, to drag the pointing icon 21, the user must maintain the touch. After the pointing icon 21 is dragged and moved to a desired location, a so-called drop is performed to release the touch. Then, the start time and the end time of the time condition may be displayed together in the time display area 22.

For example, the user pinches out the pointing icon 21 to increase the length of the point icon 21 to a length corresponding to 2 hours. Then, the user moves the pointing icon 21 by dragging the pointing icon 21, so that the start time and the end time become 6:30 PM and 8:30 PM, respectively. Here, 6:30 PM is displayed as the start time and 8:30 PM is displayed as the end time in the time display area 22. That is, the user can input a time condition by pinching out the pointing icon 21 to change the time period and then dragging the pointing icon 21. Here, if the user sets only one of the start time and the end time, the other is set naturally.

Figure 22:
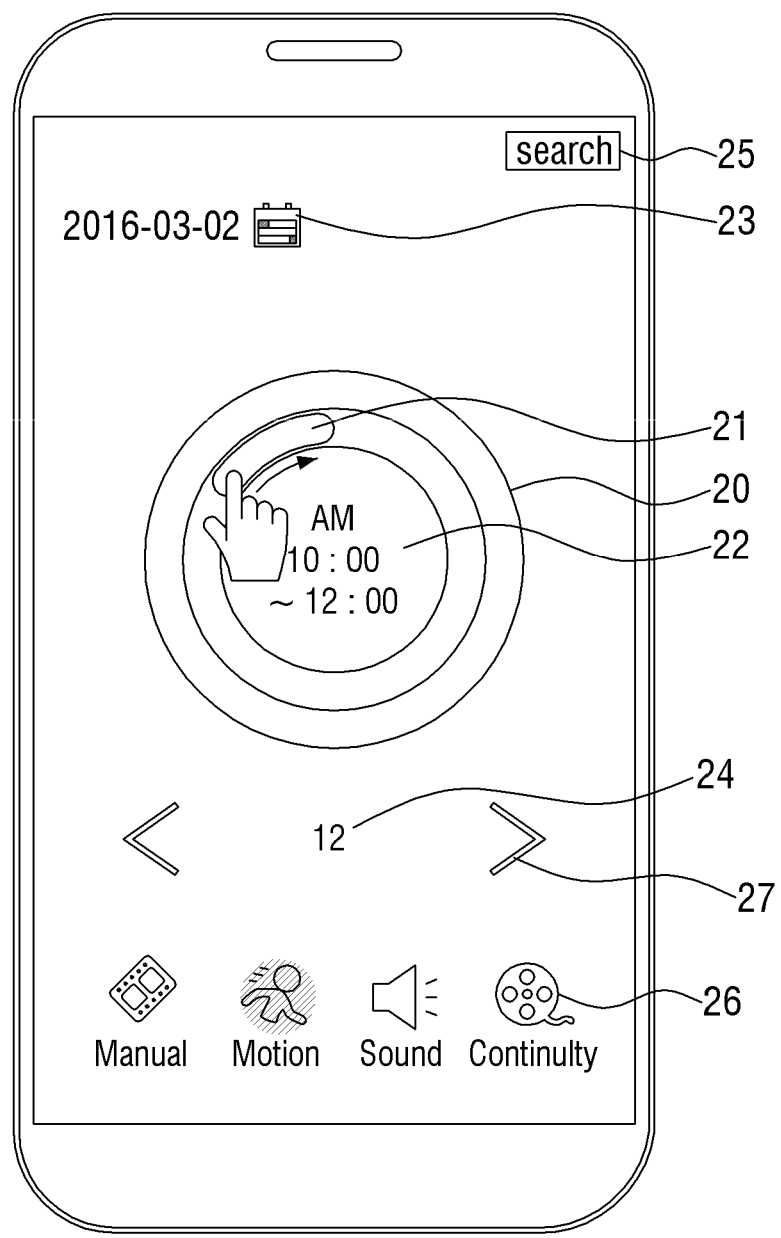
FIG. 22 illustrates an operation of dragging the pointing icon to input a time condition when the search time condition spans between the morning and the afternoon.
Figure 23:
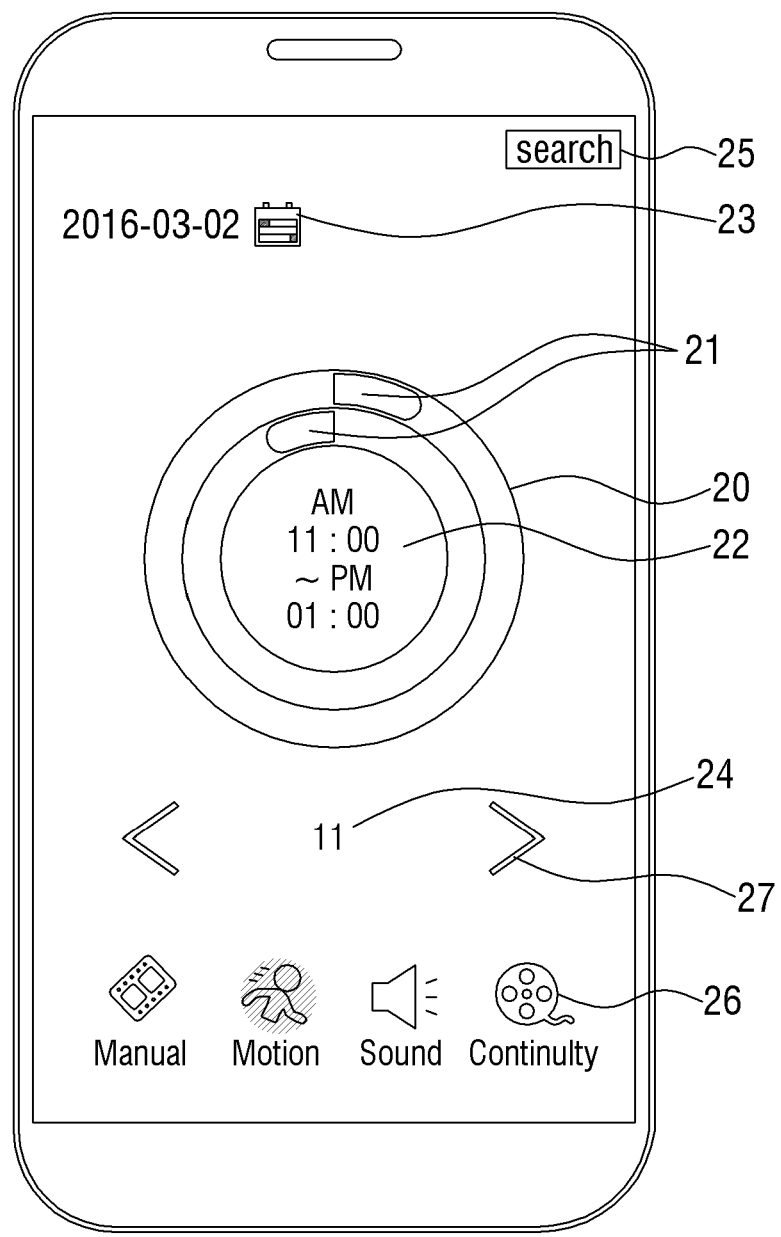
FIG. 23 illustrates the pointing icon placed on both the PM control interface and the AM control interface as a result of the operation of FIG. 22.

FIG. 22 illustrates an operation of dragging the pointing icon 21 to input a time condition when the search time condition spans between the morning and the afternoon. FIG. 23 illustrates the pointing icon 21 placed on both the PM control interface 202 and the AM control interface 201 as a result of the operation of FIG. 22.

The time control interface 20 according to an exemplary embodiment of the present disclosure includes the PM control interface 202 and the AM control interface 201 separately. In addition, afternoon and morning times may be specified separately. However, since the time is continuous, there may be a case where the range of a search time condition desired by the user spans between the morning and the afternoon. For example, the user may want to search in a range from 11:00 AM to 1:00 PM.

In this case, the user changes the time period of the pointing icon 21 to 2 hours in advance. In addition, as illustrated in FIG. 22, the pointing icon 21 is dragged to set 11:00 AM as the start time and 1:00 PM as the end time. Then, as illustrated in FIG. 23, the pointing icon 21 is automatically separated into a part located in the AM control interface 201 and a part located in the PM control interface 202. Here, the pointing icon 21 may not be formed as two separate icons, but may be displayed separately to the user on the screen unit 11. Therefore, if the user continuously drags a part of the pointing icon 21, the other part of the pointing icon 21 also moves in accordance with the user's drag.

Since the pointing icon 21 is partially located in each of the AM control interface 201 and the PM control interface 202 as described above, it is possible to easily display the case where the range of the search time condition spans between the morning and the afternoon.

Figure 24:
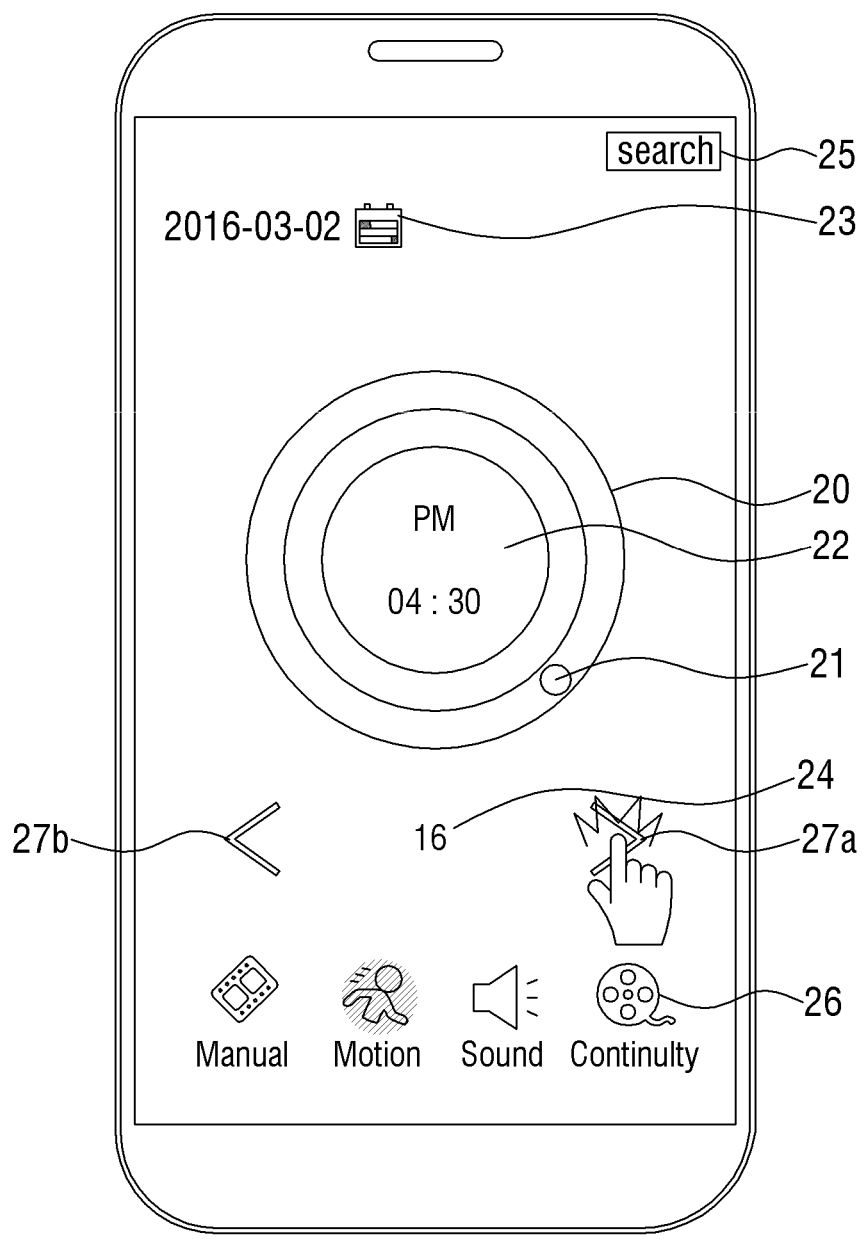
FIG. 24 illustrates an operation of tapping a direction button according to an exemplary embodiment of the present disclosure.
Figure 25:
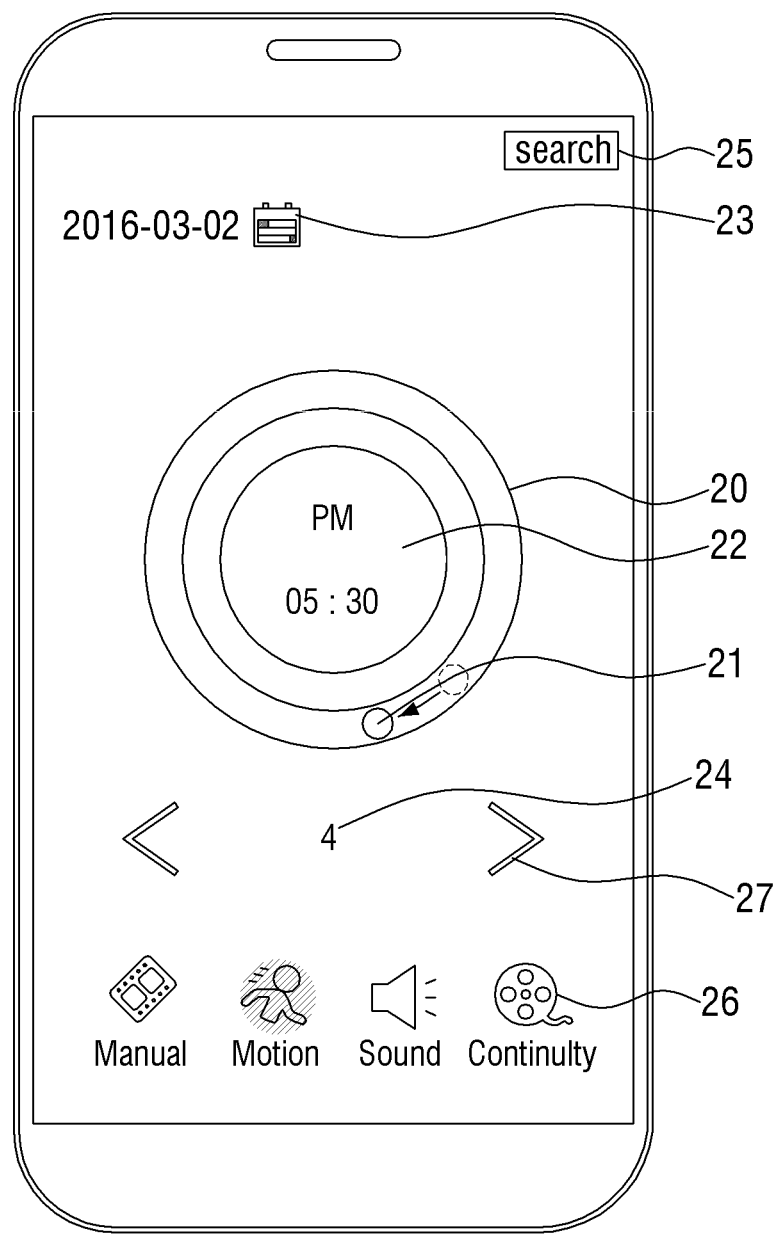
FIG. 25 illustrates a search time condition automatically changed to a period in which next events exist as a result of the operation of FIG. 24.

FIG. 24 illustrates an operation of tapping a direction button 27 according to an exemplary embodiment of the present disclosure. FIG. 25 illustrates a search time condition automatically changed to a period in which next events exist as a result of the operation of FIG. 24.

The screen unit 11 of the search device 1 according to the exemplary embodiment of the present disclosure displays the event counter 24. The event counter 24 counts the number of events that occurred in the range of a time condition input through the time control interface 20 and numerically displays the counted number. For example, as illustrated in FIG. 24, in a currently input time condition, the start time is specified as 4:30 PM, and the end time is specified as 5:00 PM because the time period is basically 30 minutes. Here, the event counter 24 displays the number 16. In addition, a motion event icon is selected from the event menu icons 26. That is, it denotes that a total of 16 motion events occurred from 4:30 PM to 5:00 PM.

A right direction button 27a is formed on the right side of the event counter 24, and a left direction button 27b is formed on the left side of the event counter 24. Using the direction button 27, the user can automatically find a time range in which events occurred. There may be a case where the user wants to specify a specific time range and search for events that occurred in that time range. In this case, the user may directly input a time condition using the time control interface 20 as described above to perform a time-based search. However, there may also be a case where the user wants to find a time range in which events actually occurred, instead of directly inputting a time condition to perform a search. In this case, the user taps the direction button 27 to find a time range in which events occurred.

For example, as illustrated in FIG. 24, the number of motion events that occurred from 4:30 PM to 5 PM, which is the currently input time condition, is 16. Here, if the user taps the right direction button 27a, a time range in which motion events occurred at a time later than the input time condition is searched for. Then, the found time range is automatically input as a time condition for searching for motion events. That is, as illustrated in FIG. 25, in a next time condition automatically input, the start time is specified as 5:30 PM, and the end time is specified as 6:00 PM because the time period is basically 30 minutes. Here, since the number 4 is displayed in the event counter 24, the total number of motion events that occurred from 5:30 PM to 6:00 PM is 4. Therefore, the time range of 5:30 PM to 6:00 PM in which motion events occurred is automatically input as a time condition for searching for events.

In addition, from the time range of 4:30 PM to 5:00 PM, a time range found as a next time range is from 5:30 PM to 6:00 PM. Therefore, it can be seen that no motion event occurred between 5 PM and 5:30 PM.

Although not illustrated in the drawings, if the user taps the left direction button 27b, a time range in which events occurred at a time earlier than the input time condition is searched for.

Figure 26:
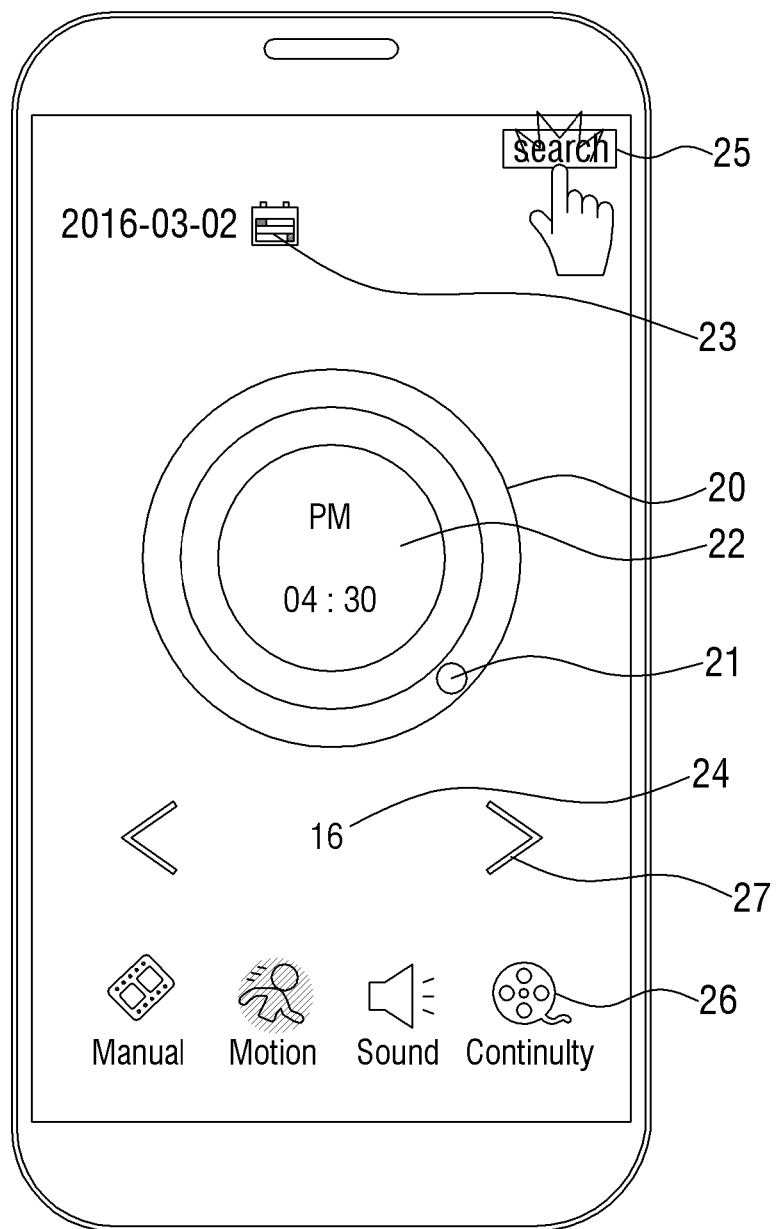
FIG. 26 illustrates an operation of tapping a Search button according to an exemplary embodiment of the present disclosure.
Figure 27:
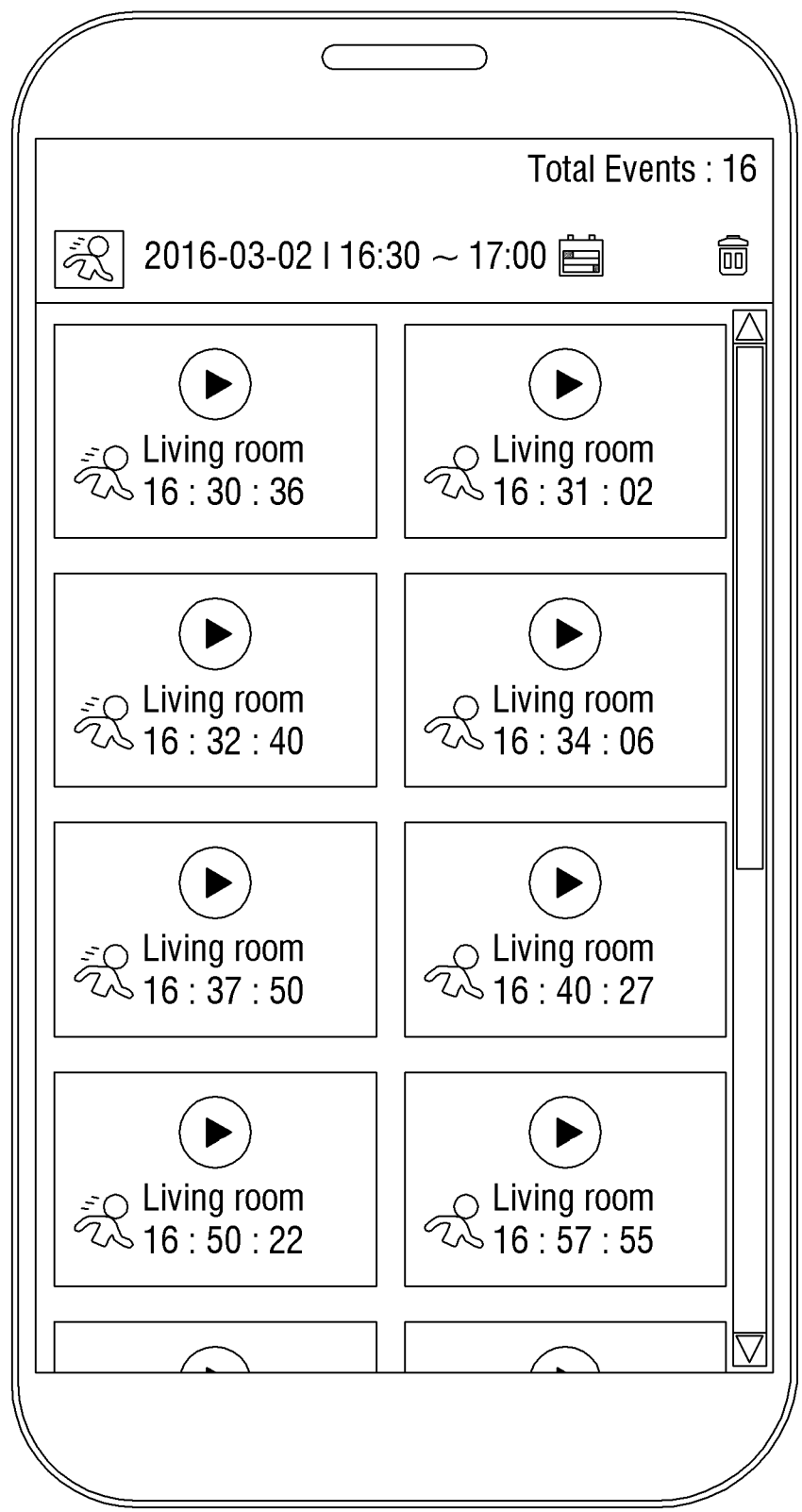
FIG. 27 illustrates search results output according to a search condition input by a user, as a result of the operation of FIG. 26.

FIG. 26 illustrates an operation of tapping a Search button 25 according to an exemplary embodiment of the present disclosure. FIG. 27 illustrates search results output according to a search condition input by the user, as a result of the operation of FIG. 26.

As described above, the user can directly input a time condition for searching by using the time control interface 20. In addition, a time condition can be automatically input by searching for a time range in which events actually occurred by using the direction button 27 based on whether events occurred.

When a time condition is input through the above method, the user taps the Search button 25 as illustrated in FIG. 26. Then, as illustrated in FIG. 27, videos or events matching the input time condition are retrieved and output.

For example, as illustrated in FIG. 26, when the user inputs 4:30 PM to 5 PM on Mar. 2, 2016 as a time condition, the number of motion events displayed in the event counter 24 is 16. When the user taps the Search button 25, videos or events matching the input time condition are retrieved and output as illustrated in FIG. 27. If the camera 2 captured an area only when an event occurred and ended the capturing immediately after the event ended, the contents of only one event would be contained in one video. In this case, the number of videos retrieved is 16. The user can check the events that occurred by playing back each of the videos.

Some of the advantages that may be achieved by exemplary embodiments of the invention and/or exemplary methods of the invention include specifying a desired date, time, type of event, etc. on one screen to search for videos and events without the need to specify the above items one by one through multiple stages.

In particular, icons for specifying the morning and the afternoon are formed separately in a time control interface for specifying a time, and the shape of the area of each of the icons corresponds to the shape of an analog clock generally familiar to people. Therefore, a user can easily specify a desired time without unfamiliarity. However, the effects are not restricted to the one set forth herein. The above and other effects will become more apparent to one of daily skill in the art by referencing the claims.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A search device comprising:
    a storage unit configured to store a video obtained from a camera;
    a screen unit configured to display the video; and
    a control unit configured to control operation of the storage unit and the screen unit,
    wherein the screen unit is configured to display a time control interface for receiving a time condition,
    wherein the search device is configured to search for videos and events stored in the storage unit in response to the time condition, and
    wherein the time control interface comprises an AM control interface which has a closed curve shape for receiving a morning time as the time condition and a PM control interface which has another closed curve shape for receiving an afternoon time as the time condition,
    wherein an area of each of the AM control interface and the PM control interface represents 12 hours,
    wherein, in response to a user's touch at a point on the time control interface, a search start time is specified and in response to a user's drag from the point on the time control interface without releasing the touch, a search time period including the search start time is specified, and
    wherein the search device is configured to search in the storage unit for the videos and the events which is within the search time period.

2. The search device of claim 1, wherein the AM control interface and the PM control interface have circular shapes which have different radii and are concentric, and the area of each of the AM control interface and the PM control interface corresponds to the time represented by an analog clock.

3. The search device of claim 1, further comprising a touch input unit configured to receive a touch signal from a user.

4. The search device of claim 1, wherein, in response to the user's touch at the point on the time control interface, the screen unit is configured to display a pointing icon at the point on the time control interface.

5. The search device of claim 4, wherein in response to the point being dragged after being held for a predetermined period of time, the screen unit is configured to display the pointing icon extended along the time control interface.

6. The search device of claim 4, wherein, in response to the pointing icon being pinched out, the screen unit is configured to display the pointing icon extended along the time control interface.

7. The search device of claim 1, wherein the screen unit is further configured to display a calendar icon to receive a date condition,
wherein the time control interface further comprises at least one of a day control interface and a month control interface for receiving a date condition, and
wherein the search device is configured to search for videos or events stored in the storage unit in response to the date condition.

8. The search device of claim 1, wherein the time control interface further comprises a time display area inside the time control interface for displaying the time condition received, and,
wherein, in response to receiving a flick input on the time display area, the search device is configured to change a date condition according to a direction of the flick input.

9. The search device of claim 1, wherein the control unit comprises:
a gesture detector configured to receive a user command by detecting a touch gesture or an air gesture; and
a coordinate transformer configured to receive coordinates of the user command received from the gesture detector and configured to generate a time change value of the time control interface.

10. The search device of claim 1, wherein a search date condition of the time control interface is changed in response to receiving a touch gesture input and an air gesture input.

11. The search device of claim 1, wherein the screen unit is further configured to display an event counter which numerically displays a number of events that meet the time condition.

12. The search device of claim 1, wherein the screen unit is further configured to display a direction button, and
wherein, in response to receiving an input to the direction button, the search device is configured to automatically search for a time condition in which events occurred.

13. A search system comprising:
a camera configured to obtain a video by capturing a specific area;
a sensor configured to generate a signal in response to detecting events;
a search device configured to receive, store, and search for the video and the signal, the search device comprising:
a communication unit configured to receive the video from the camera and the signal from the sensor;
a storage unit configured to store the received video and signal;
a screen unit configured to display the video; and
a control unit configured to control the communication unit, the storage unit, and the screen unit,
wherein the screen unit is configured to display a time control interface for receiving a time condition, the time control interface comprising an AM control interface for receiving a morning time as the time condition and a PM control interface for receiving an afternoon time as the time condition,
wherein the AM control interface and the PM control interface have circular shapes which have different radii and are concentric, and an area of each of the AM control interface and the PM control interface represents 12 hours and corresponds to the time represented by an analog clock, and
wherein, in response to a user's touch at a point on the time control interface, a search start time is specified and in response to a user's drag from the point on the time control interface without releasing the touch, a search time period including the search start time is specified, and
wherein the search device is configured to search in the storage unit for the videos and the events which is within the search time period.

14. The search system of claim 13, wherein the control unit comprises:
a gesture detector configured to receive a user command by detecting a touch gesture or an air gesture; and
a coordinate transformer configured to receive coordinates, at which the user command received from the gesture detector and configured to generate a time change value of the time control interface.

15. The search system of claim 13, wherein the screen unit is configured to display a pointing icon on the time control interface, and
in response to the pointing icon being pinched out, the screen unit is configured to display the pointing icon extended along the time control interface.

16. The search system of claim 13, wherein the screen unit is further configured to display an event counter which numerically displays a number of events that meet the time condition.

17. A search system comprising:
a camera configured to obtain a video by capturing a specific area; and
a search device configured to receive, stores, and searches for the video, the search device comprising:
a communication unit configured to receive the video from the camera;
a storage unit configured to store the received video;
a screen unit configured to display the video; and
a control unit configured to control the communication unit, the storage unit, and the screen unit,
wherein the control unit is configured to determine an occurrence of an event within a region of interest (ROI) specified in the video obtained by the camera,
wherein the screen unit is configured to display a time control interface for receiving a time condition, the time control interface comprising an AM control interface for receiving a morning time as the time condition and a PM control interface for receiving an afternoon time as the time condition,
wherein the AM control interface and the PM control interface have circular shapes which have different radii and are concentric, and an area of each of the AM control interface and the PM control interface represents 12 hours and corresponds to the time represented by an analog clock, and
wherein, in response to a user's touch at a point on the time control interface, a search start time is specified and in response to a user's drag from the point on the time control interface without releasing the touch, a search time period including the search start time is specified, and wherein the search device is configured to search in the storage unit for the videos and the events which is within the search time period.

18. The search system of claim 17, wherein the control unit comprises:

a gesture detector configured to receive a user command by detecting a touch gesture or an air gesture; and a coordinate transformer configured to receive coordinates, at which the user command received, from the gesture detector and configured to generate a time change value of the time control interface.

19. The search system of claim 17, wherein the screen unit is configured to display a pointing icon on the time control interface, and wherein, in response to the pointing icon being pinched out, the screen unit is configured to display the pointing icon extended along the time control interface.

20. The search system of claim 17, wherein the screen unit is further configured to display an event counter which numerically displays a number of events that meet the time condition.

\* \* \* \* \*